United States Patent
Oh et al.

(10) Patent No.: US 11,259,049 B2
(45) Date of Patent: Feb. 22, 2022

(54) AREA-BASED PROCESSING METHOD AND APPARATUS FOR 360-DEGREE VIDEO

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/732,059

(22) Filed: Dec. 31, 2019

(65) Prior Publication Data

US 2020/0186833 A1 Jun. 11, 2020

Related U.S. Application Data

(63) Continuation of application No. PCT/KR2017/013437, filed on Nov. 23, 2017.

(60) Provisional application No. 62/535,178, filed on Jul. 20, 2017, provisional application No. 62/528,516, filed on Jul. 4, 2017.

(51) Int. Cl.
*H04N 19/597* (2014.01)
*H04N 19/129* (2014.01)
*H04N 19/172* (2014.01)

(52) U.S. Cl.
CPC ......... *H04N 19/597* (2014.11); *H04N 19/129* (2014.11); *H04N 19/172* (2014.11)

(58) Field of Classification Search
None
See application file for complete search history.

(56) References Cited

U.S. PATENT DOCUMENTS

| 2013/0016769 A1 | 1/2013 | Chen et al. |
| 2015/0016504 A1* | 1/2015 | Auyeung ............. H04N 19/103 375/240.02 |
| 2016/0150241 A1* | 5/2016 | Hirabayashi ....... H04N 21/2358 375/240.21 |

(Continued)

FOREIGN PATENT DOCUMENTS

| JP | 2016019248 | 2/2016 |
| KR | 1020150140360 | 12/2015 |

(Continued)

OTHER PUBLICATIONS

Telecommunication Standardization Sector of ITU, "Series H: Audiovisual and Multimedia Systems Infrastructure of audiovisual services—Coding of moving video—High efficiency video coding", Recommendation ITU-T H.265, Dec. 2016.*

(Continued)

*Primary Examiner* — Edemio Navas, Jr.
(74) *Attorney, Agent, or Firm* — Lee Hong Degerman Kang Waimey

(57) ABSTRACT

A 360-degree image encoding method that is performed by an encoding apparatus according to the present disclosure comprises the steps of: obtaining a two-dimensional (2D) space picture with respect to 360-degree video data; deriving motion constrained tile sets (MCTSs) for configuring a sub-picture from the 2D picture; configuring the sub-picture including the MCTSs based on the MCTSs; and encoding the sub-picture so as to output encoded image information, wherein the MCTSs are arranged in the raster scan order on the sub-picture.

8 Claims, 21 Drawing Sheets

(56) References Cited

U.S. PATENT DOCUMENTS

2017/0155912 A1\* 6/2017 Thomas ............... H04N 21/816
2018/0376126 A1\* 12/2018 Hannuksela ....... H04N 5/23238
2020/0012863 A1\* 1/2020 Skupin ............... G06K 9/00744

FOREIGN PATENT DOCUMENTS

KR    1020160034889       3/2016
WO    WO-2018160976 A2 \*  9/2018  ........... H04N 19/184

OTHER PUBLICATIONS

PCT International Application No. PCT/KR2017/013437, International Search Report dated Apr. 3, 2018, 6 pages.

Skupin, R. et al., "MCTS extraction with slice reordering", Joint Collaborative Team on Video Coding (JCT-VC) of ITU-T SG 16 WP 3 and ISO/IEC JTC 1/SC 29/WG 11, Apr. 2017, 5 pages.

Skupin et al., "MCTS extraction with slice reordering", Joint Collaborative Team on Video Calling (JCT-VC) of ITU-T SG 16 WP 3 and ISO/IEC JTC 1/SC 29/WG 11, Document: JCTVC-AA0029, Apr. 2017, 3 pages.

Wu et al., "Motion-constrained tile sets SEI message", Joint Collaborative Team on Video Calling (JCT-VC) of ITU-T SG 16 WP 3 and ISO/IEC JTC 1/SC 29/WG 11, Document: JCTVC-M0235 (v.2), Apr. 2013, 4 pages.

Korean Intellectual Property Office Application No. 10-2019-7038837, Notice of Allowance dated Sep. 23, 2021, 10 pages.

Hyun-Mook Oh et al., "On MCTS extraction information set SEI message", JCTVC-AB0037r1, ITU-T SG 16 WP 3 and ISO/IEC JTC 1/SC 29/WG 11, Jul. 2017, 3 pages.

\* cited by examiner

AREA-BASED PROCESSING METHOD AND APPARATUS FOR 360-DEGREE VIDEO

CROSS-REFERENCE TO RELATED APPLICATIONS

This application is a continuation of International Application No. PCT/KR2017/013437, filed on Nov. 23, 2017, which claims the benefit of U.S. Provisional Application No. 62/528,516, filed on Jul. 4, 2017, and 62/535,178, filed on Jul. 20, 2017, the contents of which are all hereby incorporated by reference herein in their entireties.

TECHNICAL FIELD

The present disclosure relates to 360-degree video data processing and, most particularly, to an area-based processing method and apparatus for 360-degree video.

BACKGROUND

Virtual reality (VR) systems provide users with sensory experiences through which the users may feel as if they were in electronically projected environments. A system for providing VR may be further improved in order to provide higher-quality images and spatial sound. VR systems may enable users to interactively enjoy VR content.

360-degree video can be used on the three-dimension (3D) for VR systems and may be projected to two-dimensional (2D) pictures and processed according to various methods. There is a need for methods for efficient data processing and transmission with respect to 360-degree video.

SUMMARY

A technical object of the present disclosure is to provide a method and apparatus for processing VR video data for providing a VR system.

Another technical object of the present disclosure is to provide a method and apparatus for transmitting 360-degree video data and metadata corresponding to the 360-degree video data.

Yet another technical object of the present disclosure is to provide a method and apparatus for processing area-based 360-degree video data.

Yet another technical object of the present disclosure is to provide a method and apparatus for configuring a sub-picture of a 360-degree video.

A further object of the present disclosure is to provide a method and apparatus for realigning areas for processing 360-degree video.

According to an embodiment of the present disclosure, provided herein is an image encoding method performed by an encoding device. The method may include the steps of acquiring a two-dimensional space (2D) picture for 360-degree video data, deriving motion constrained tile sets (MCTSs) for a sub-picture configuration within the 2D picture, configuring the sub-picture including the MCTSs based on the MCTSs, and encoding the sub-picture and outputting encoded image information, wherein the MCTSs may be arranged according to a raster scan order on the sub-picture.

According to another embodiment of the present disclosure, provided herein is an encoding device performing an image encoding method. The encoding device may include an encoder acquiring a two-dimensional space (2D) picture for 360-degree video data, deriving motion constrained tile sets (MCTSs) for a sub-picture configuration within the 2D picture, configuring the sub-picture including the MCTSs based on the MCTSs, and encoding the sub-picture and outputting encoded image information, wherein the MCTSs may be arranged according to a raster scan order on the sub-picture.

According to another embodiment of the present disclosure, provided herein is an image decoding method performed by a decoding device. The method may include the steps of acquiring image information for a sub-picture, deriving motion constrained tile sets (MCTSs) for the sub-picture based on the image information, and decoding the sub-picture based on the MCTSs, wherein the MCTSs may correspond to part of an area within a 2D picture for 360-degree video data, and wherein the MCTSs may be arranged according to a raster scan order on the sub-picture.

According to another embodiment of the present disclosure, provided herein is a decoding device performing an image decoding method. The decoding device may include a decoder acquiring image information for a sub-picture, deriving motion constrained tile sets (MCTSs) for the sub-picture based on the image information, and decoding the sub-picture based on the MCTSs, wherein the MCTSs may correspond to part of an area within a 2D picture for 360-degree video data, and wherein the MCTSs may be arranged according to a raster scan order on the sub-picture.

According to another embodiment of the present disclosure, provided herein is a 360-degree video data processing method performed by a 360-degree video transmitting device. The method may include the steps of acquiring 360-degree video data, acquiring a two-dimensional space (2D) picture by processing the 360-degree video data, deriving motion constrained tile sets (MCTSs) for a sub-picture configuration within the 2D picture, configuring the sub-picture including the MCTSs based on the MCTSs, encoding the sub-picture and generating encoded image information, and performing processes for storing or transmitting on the encoded image information, and wherein the MCTSs may be arranged according to a raster scan order on the sub-picture.

According to another embodiment of the present disclosure, provided herein is a 360-degree video data processing method performed by a 360-degree video receiving device. The method may include the steps of acquiring image information for a sub-picture, deriving motion constrained tile sets (MCTSs) for the sub-picture based on the image information, decoding the sub-picture based on the MCTSs, and processing the decoded sub picture and rendering the decoded sub-picture to a 3D space, wherein the MCTSs correspond to part of an area within a 2D picture for 360-degree video data, and wherein the MCTSs may be arranged according to a raster scan order on the sub-picture.

According to the present disclosure, 360-degree video data may be efficiently processed.

According to the present disclosure, by performing area-based processing on the 360-degree video data, a processing speed may be enhanced, and a user may be efficiently provided with an interactive experience.

According to the present disclosure, by realigning MCTSs within a 2D picture that is acquired from the 360-degree video, a sub-picture may be efficiently configured.

DESCRIPTION OF EXEMPLARY EMBODIMENTS

Figure 1:
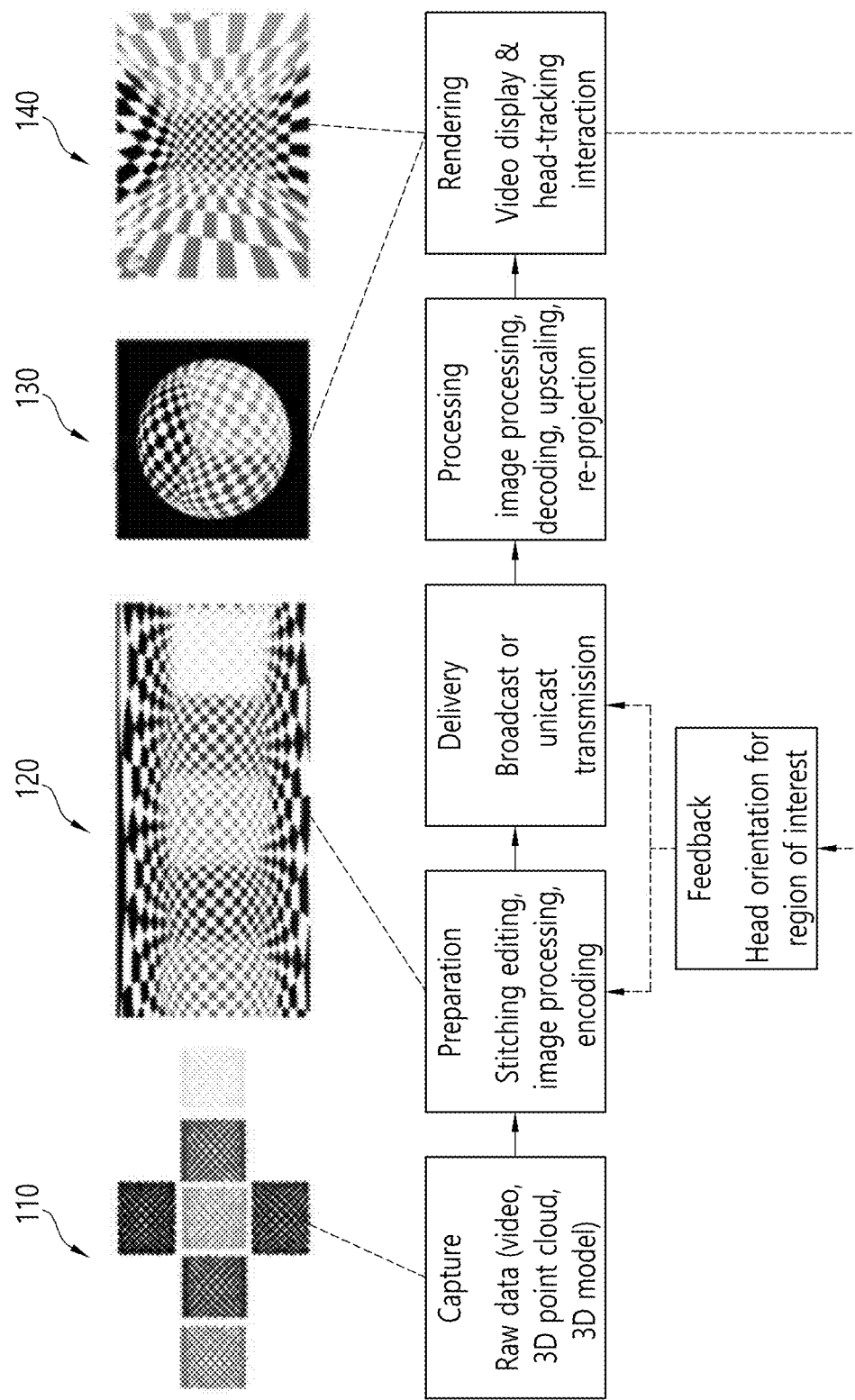
FIG. 1 is a view illustrating overall architecture for providing a 360-degree video according to the present embodiment.

The present embodiment may be modified in various forms, and specific examples thereof will be described and illustrated in the drawings. However, the examples are not intended for limiting the embodiment. The terms used in the following description are used to merely describe specific examples, but are not intended to limit the embodiment. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the example are independently drawn for the purpose of convenience for explanation of different specific functions, and do not mean that the elements are embodied by independent hardware or independent software. For example, two or more elements of the elements may be combined to form a single element, or one element may be divided into plural elements. The examples in which the elements are combined and/or divided belong to the embodiment without departing from the concept of the embodiment.

Hereinafter, preferred examples of the present embodiment will be described in more detail with reference to the attached drawings. Hereinafter, the same reference numbers will be used throughout this specification to refer to the same components and redundant description of the same component will be omitted.

FIG. 1 is a view illustrating overall architecture for providing a 360-degree video according to the present embodiment.

The present embodiment proposes a method of providing 360-degree content in order to provide virtual reality (VR) to users. VR may refer to technology for replicating actual or virtual environments or those environments. VR artificially provides sensory experience to users and thus users can experience electronically projected environments.

360-degree content refers to content for realizing and providing VR and may include a 360-degree video and/or 360-degree audio. The 360-degree video may refer to video or image content which is necessary to provide VR and is captured or reproduced omnidirectionally (360 degrees). Hereinafter, the 360 video may refer to 360-degree video or omnidirectional video. A 360-degree video may refer to a video or an image represented on 3D spaces in various forms according to 3D models. For example, a 360-degree video can be represented on a spherical surface. The 360-degree audio is audio content for providing VR and may refer to spatial audio content whose audio generation source can be recognized to be located in a specific 3D space. 360 audio may refer to 360-degree audio. 360-degree content may be generated, processed and transmitted to users and users can consume VR experiences using the 360-degree content.

Particularly, the present embodiment proposes a method for effectively providing a 360-degree video. To provide a 360-degree video, a 360-degree video may be captured through one or more cameras. The captured 360-degree video may be transmitted through series of processes and a reception side may process the transmitted 360-degree video into the original 360-degree video and render the 360-degree video. In this manner, the 360-degree video can be provided to a user.

Specifically, processes for providing a 360-degree video may include a capture process, a preparation process, a transmission process, a processing process, a rendering process and/or a feedback process.

The capture process may refer to a process of capturing images or videos for a plurality of viewpoints through one or more cameras. Image/video data (110) shown in FIG. 1 may be generated through the capture process. Each plane of (110) in FIG. 1 may represent an image/video for each viewpoint. A plurality of captured images/videos may be referred to as raw data. Metadata related to capture can be generated during the capture process.

For capture, a special camera for VR may be used. When a 360-degree video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image (120) in FIG. 1.

Video data projected on the 2D image may be subjected to the region-wise packing process in order to improve video coding efficiency. Region-wise packing may refer to a process of processing video data projected on a 2D image for each region. Here, regions may refer to divided areas of a 2D image on which 360-degree video data is projected. Regions can be obtained by dividing a 2D image equally or arbitrarily according to an embodiment. Further, regions may be divided according to a projection scheme in an embodiment. The region-wise packing process is an optional process and may be omitted in the preparation process.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360-degree video according to an embodiment. For example, it is possible to increase the resolution of regions corresponding to relatively more important regions in a 360-degree video to be higher than the resolution of other regions. Video data projected on the 2D image or region-wise packed video data may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form (130) shown in FIG. 1. The form (130) shown in FIG. 1 corresponds to a case in which the image/video is re-projected on a 3D spherical model. A user can view a region of the rendered image/video through a VR display. Here, the region viewed by the user may have a form (140) shown in FIG. 1.

The feedback process may refer to a process of delivering various types of feedback information which can be acquired in a display process to a transmission side. Interactivity in consumption of a 360-degree video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360-degree video which is currently viewed by the user, that is, viewport information, can be calculated.

The viewport information may be information about a region in a 360-degree video which is currently viewed by a user. Gaze analysis may be performed through the viewpoint information to check how the user consumes the 360-degree video, which region of the 360-degree video is gazed by the user, how long the region is gazed, and the like. Gaze analysis may be performed at a reception side and a result thereof may be delivered to a transmission side through a feedback channel A device such as a VR display may extract a viewport region based on the position/direction of the head of a user, information on a vertical or horizontal field of view (FOY) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360-degree video with respect to a region currently viewed by the user may be preferentially decoded and rendered using the head orientation information and/or the viewport information.

Here, a viewport or a viewport region may refer to a region in a 360-degree video being viewed by a user. A viewpoint is a point in a 360-degree video being viewed by a user and may refer to a center point of a viewport region. That is, a viewport is a region having a viewpoint at the center thereof, and the size and the shape of the region can be determined by an FOV which will be described later.

In the above-described overall architecture for providing a 360-degree video, image/video data which is subjected to the capture/projection/encoding/transmission/decoding/re-projection/rendering processes may be referred to as 360-degree video data. The term "360-degree video data" may be used as the concept including metadata and signaling information related to such image/video data.

To store and transmit media data such as the aforementioned audio and video data, a standardized media file format may be defined. According to an embodiment, a media file may have a file format based on ISO BMFF (ISO base media file format).

Figure 2:
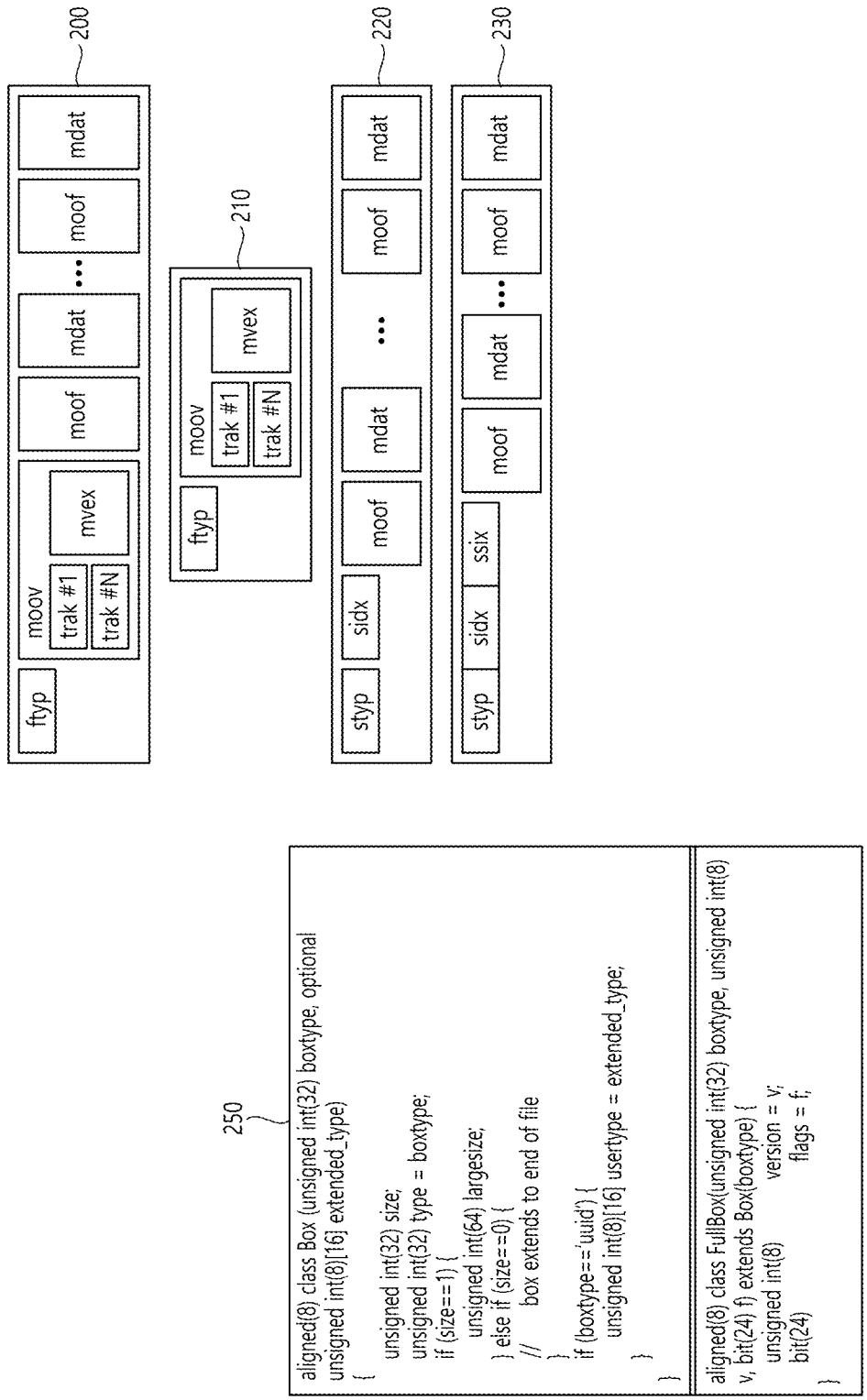
FIGS. 2 and 3 are views illustrating a structure of a media file according to an example of the present embodiment.
Figure 3:
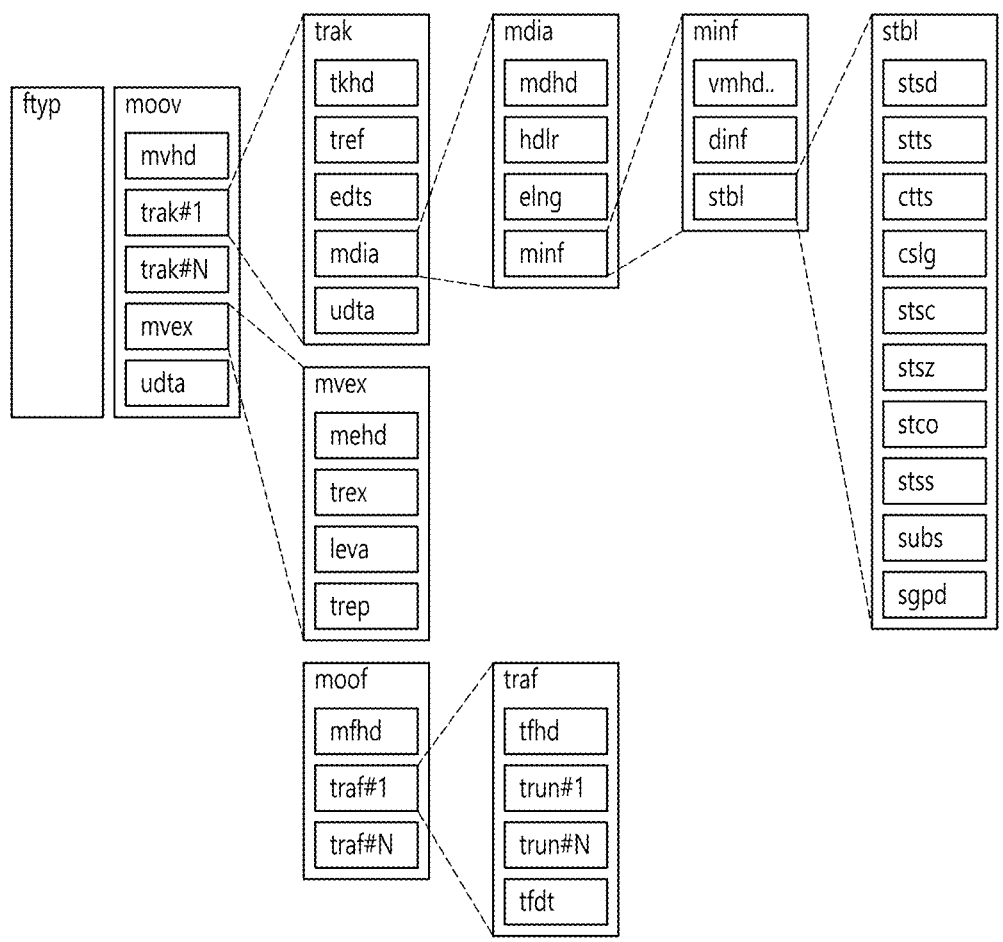

FIGS. 2 and 3 are views illustrating a structure of a media file according to an embodiment of the present embodiment.

The media file according to the present embodiment may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to the present embodiment may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to the present embodiment may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment (210) may include information related to media decoder initialization except media data. This file may correspond to the aforementioned initialization segment, for example. The initialization segment can include the aforementioned ftyp box and/or moov box.

A file of the illustrated embodiment (220) may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment (230), an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment (250). In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (attributes) for 360-degree video according to the present embodiment may be comprised in DASH based adaptive streaming model and delivered.

Figure 4:
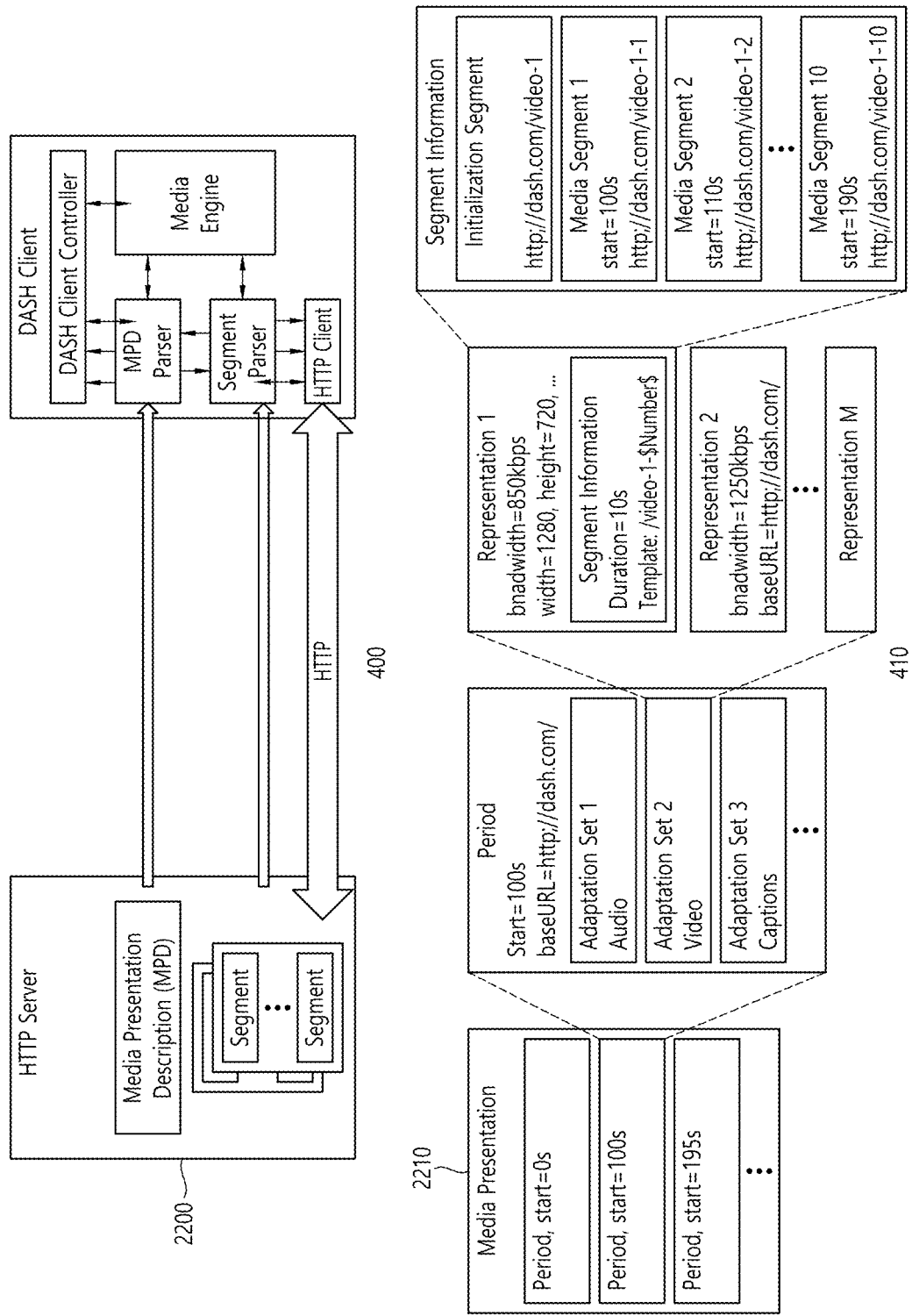
FIG. 4 illustrates an example of the overall operation of a DASH-based adaptive streaming model.

FIG. 4 illustrates an example of the overall operation of a DASH-based adaptive streaming model. The DASH-based adaptive streaming model according to an illustrated embodiment (400) illustrates an operation between an HTTP server and a DASH client. Here, Dynamic Adaptive Streaming over HTTP (DASH) is a protocol for supporting HTTP-based adaptive streaming and can dynamically support streaming according to a network state. Accordingly, AV content may be seamlessly reproduced.

First, the DASH client may acquire an MPD. The MPD may be delivered from a service provider, such as the HTTP server. The DASH client may request a segment from the server using segment access information described in the MPD. Here, this request may be performed in view of the network condition.

After acquiring the segment, the DASH client may process the segment in a media engine and may display the segment on a screen. The DASH client may request and acquire a necessary segment in view of reproduction time and/or the network state in real time (adaptive streaming). Accordingly, content may be seamlessly reproduced.

The media presentation description (MPD) is a file including detailed information for allowing the DASH client to dynamically acquire a segment and may be expressed in XML format.

A DASH client controller may generate a command to request an MPD and/or a segment in view of the network state. In addition, the controller may control acquired information to be used in an internal block, such as the media engine.

An MPD parser may parse the acquired MPD in real time. Accordingly, the DASH client controller can generate a command to acquire a required segment.

A segment parser may parse the acquired segment in real time. Depending on pieces of information included in the segment, internal blocks including the media engine may perform certain operations.

An HTTP client may request a required MPD and/or segment from the HTTP server. The HTTP client may also deliver an MPD and/or segment acquired from the server to the MPD parser or the segment parser.

The media engine may display content on a screen using media data included in the segment. Here, pieces of information of the MPD may be used.

A DASH data model may have a hierarchical structure (410). A media presentation may be described by the MPD. The MPD may describe a temporal sequence of a plurality of periods forming a media presentation. A period may represent one section of media content.

In one section, pieces of data may be included in adaptation sets. An adaptation set may be a collection of a plurality of media content components that can be exchanged with each other. An adaptation set may include a collection of representations. A representation may correspond to a media content component. Within one representation, content may be temporally divided into a plurality of segments, which may be for proper accessibility and delivery. The URL of each segment may be provided to enable access to each segment.

The MPD may provide information related to the media presentation, and a period element, an adaptation set element, and a presentation element may describe a period, an adaptation set, and a presentation, respectively. A representation may be divided into sub-representations, and a sub-representation element may describe a sub-representation.

Common properties/elements may be defined, which may be applied to (included in) an adaptation set, a representation, a sub-representation, or the like. Among the common properties/elements, there may be an essential property and/or a supplemental property.

The essential property may be information including elements that are considered essential in processing media presentation-related data. The supplemental property may be information including elements that may be used for processing the media presentation-related data. Descriptors to be described in the following embodiments may be defined and delivered in an essential property and/or a supplemental property when delivered via the MPD.

Figure 5:
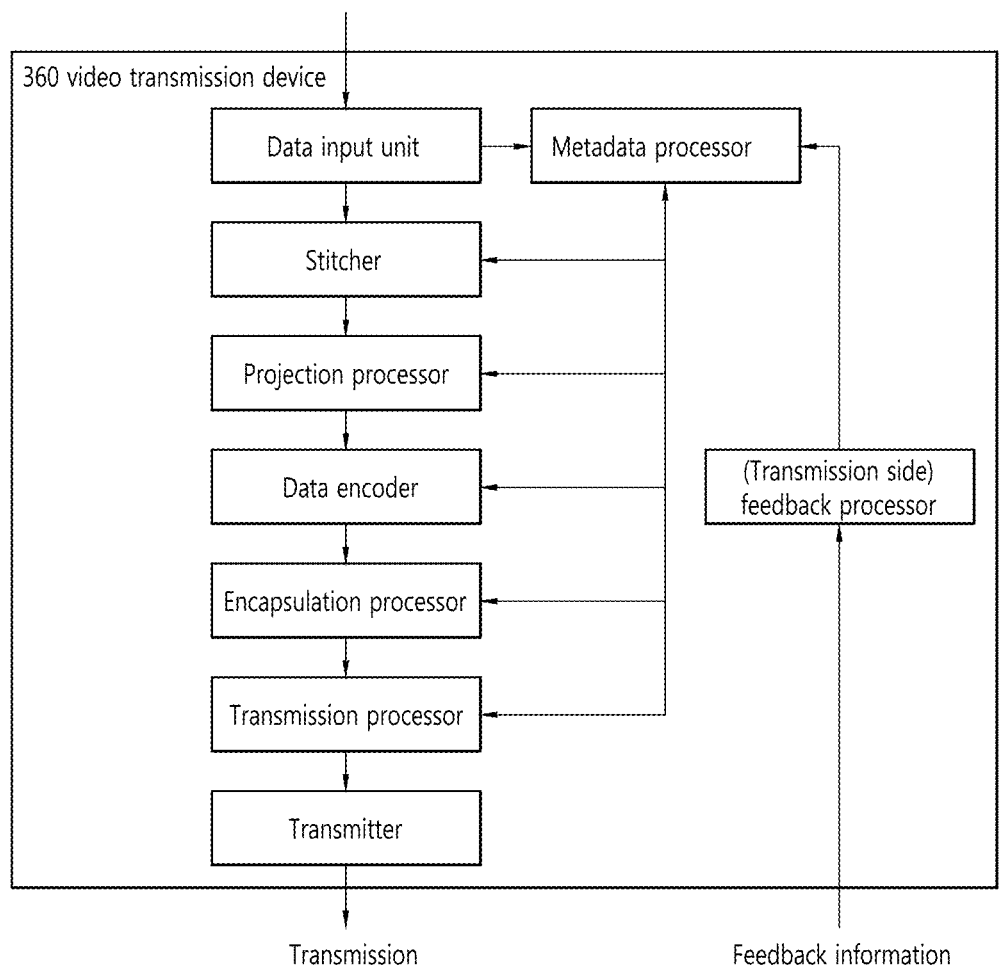
FIG. 5 is a view schematically illustrating a configuration of a 360-degree video transmission device to which the present embodiment is applicable.

FIG. 5 is a view schematically illustrating a configuration of a 360-degree video transmission device to which the present embodiment is applicable.

The 360-degree video transmission device according to the present embodiment can perform operations related the above-described preparation process and the transmission process. The 360-degree video transmission device may include a data input unit, a stitcher, a projection processor, a region-wise packing processor (not shown), a metadata processor, a (transmission side) feedback processor, a data encoder, an encapsulation processor, a transmission processor, and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360-degree video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360-degree video data on a 2D image. The projection processor may perform projection according to various schemes which will be described later. The projection processor may perform mapping in consideration of the depth of 360-degree video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360-degree video data (projected picture) into regions and rotating and rearranging regions or changing the resolution of each region. As described above, the region-wise packing process is optional and thus the region-wise packing processor may be omitted when region-wise packing is not performed. The result of the region-wise packing process for the projected picture can be referred to as packed picture. The projected picture can be treated as the packed picture when the region-wise packing processor is omitted. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360-degree video-related metadata using such metadata. According to an embodiment, the metadata processor may generate the 360-degree video-related metadata in the form of a signaling table. 360-degree video-related metadata may also be called metadata or 360-degree video related signaling information according to signaling context. Further, the metadata processor may forward the acquired or generated metadata to internal elements of the 360-degree video transmission device as necessary. The metadata processor may forward the 360-degree video-related metadata to the data encoder, the encapsulation processor and/or the transmission processor such that the 360-degree video-related metadata can be transmitted to a reception side.

The data encoder can encode the 360-degree video data projected on the 2D image and/or region-wise packed 360-degree video data. The 360-degree video data can be encoded in various formats.

The encapsulation processor can encapsulate the encoded 360-degree video data and/or 360-degree video-related metadata in a file format. Here, the 360-degree video-related metadata may be received from the metadata processor. The encapsulation processor can encapsulate the data in a file format such as ISOBMFF, CFF or the like or process the data into a DASH segment or the like. The encapsulation processor may include the 360-degree video-related metadata in a file format. The 360-degree video-related metadata may be included in a box having various levels in SOBMFF or may be included as data of a separate track in a file, for example. According to an embodiment, the encapsulation processor may encapsulate the 360-degree video-related metadata into a file. The transmission processor may perform processing for transmission on the encapsulated 360-degree video data according to file format. The transmission processor may process the 360-degree video data according to an arbitrary transmission protocol. The processing for transmission may include processing for delivery over a broadcast network and processing for delivery over a broadband. According to an embodiment, the transmission processor may receive 360-degree video-related metadata from the metadata processor as well as the 360-degree video data and perform the processing for transmission on the 360-degree video-related metadata.

The transmitter can transmit the 360-degree video data and/or the 360-degree video-related metadata processed for transmission through a broadcast network and/or a broadband. The transmitter may include an element for transmission through a broadcast network and/or an element for transmission through a broadband.

According to an example of the 360-degree video transmission device according to the present embodiment, the 360-degree video transmission device may further include a data storage unit (not shown) as an internal/external element. The data storage unit may store encoded 360-degree video data and/or 360-degree video-related metadata before the encoded 360-degree video data and/or 360-degree video-related metadata are delivered to the transmission processor. Such data may be stored in a file format such as ISOBMFF. Although the data storage unit may not be required when 360-degree video is transmitted in real time, encapsulated 360-degree data may be stored in the data storage unit for a certain period of time and then transmitted when the encapsulated 360-degree data is delivered over a broadband.

According to another example of the 360-degree video transmission device according to the present embodiment, the 360-degree video transmission device may further include a (transmission side) feedback processor and/or a network interface (not shown) as internal/external elements. The network interface can receive feedback information from a 360-degree video reception device according to the present embodiment and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360-degree video data processing.

According to another example of the 360-degree video transmission device according to the present embodiment, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360-degree video data on a spherical surface before projection. Information about region rotation, that is, rotation directions, angles and the like may be signaled through 360-degree video-related metadata. According to another example of the 360-degree video transmission device according to the present embodiment, the data encoder may perform encoding differently for respective regions. The data encoder may encode a specific region in high quality and encode other regions in low quality. The transmission side feedback processor may forward feedback information received from the 360-degree video reception device to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another example of the 360-degree video transmission device according to the present embodiment, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360-degree video reception device to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360-degree video transmission device according to the present embodiment may be hardware elements. According to an embodiment, the internal/external elements may be changed, omitted, replaced by other elements or integrated.

Figure 6:
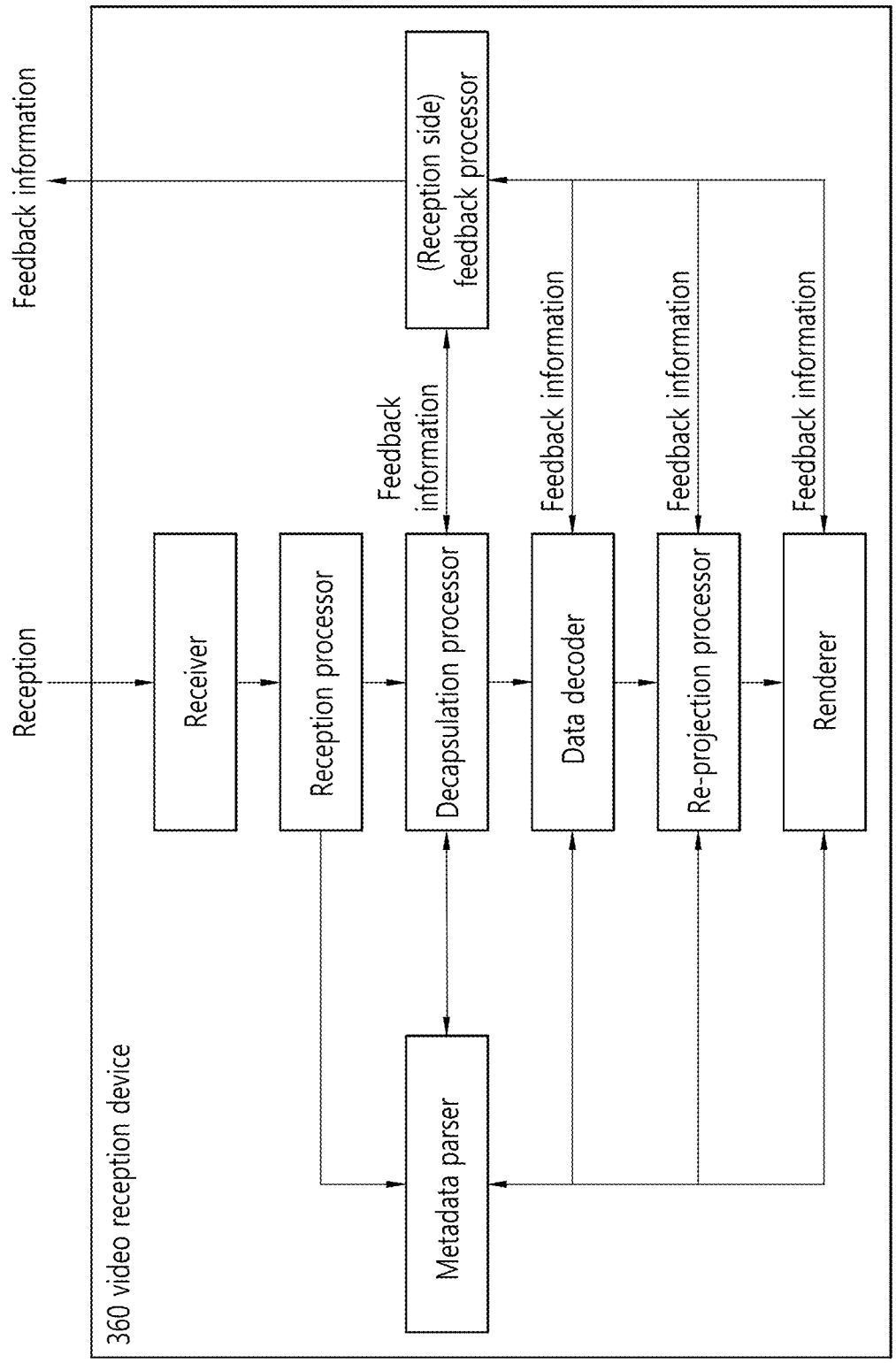
FIG. 6 is a view schematically illustrating a configuration of a 360-degree video reception device to which the present embodiment is applicable.

FIG. 6 is a view schematically illustrating a configuration of a 360-degree video reception device to which the present embodiment is applicable.

The 360-degree video reception device according to the present embodiment can perform operations related to the above-described processing process and/or the rendering process. The 360-degree video reception device may include a receiver, a reception processor, a decapsulation processor, a data decoder, a metadata parser, a (reception side) feedback processor, a re-projection processor, and/or a renderer as internal/external elements. A signaling parser may be called the metadata parser.

The receiver can receive 360-degree video data transmitted from the 360-degree video transmission device according to the present embodiment. The receiver may receive the 360-degree video data through a broadcast network or a broadband depending on a channel through which the 360-degree video data is transmitted.

The reception processor can perform processing according to a transmission protocol on the received 360-degree video data. The reception processor may perform a reverse process of the process of the aforementioned transmission processor such that the reverse process corresponds to processing for transmission performed at the transmission side. The reception processor can forward the acquired 360-degree video data to the decapsulation processor and forward acquired 360-degree video-related metadata to the metadata parser. The 360-degree video-related metadata acquired by the reception processor may have the form of a signaling table.

The decapsulation processor can decapsulate the 360-degree video data in a file format received from the reception processor. The decapsulation processor can acquired 360-degree video data and 360-degree video-related metadata by decapsulating files in ISOBMFF or the like. The decapsulation processor can forward the acquired 360-degree video data to the data decoder and forward the acquired 360-degree video-related metadata to the metadata parser. The 360-degree video-related metadata acquired by the decapsulation processor may have the form of a box or a track in a file format. The decapsulation processor may receive metadata necessary for decapsulation from the metadata parser as necessary.

The data decoder can decode the 360-degree video data. The data decoder may receive metadata necessary for decoding from the metadata parser. The 360-degree video-related metadata acquired in the data decoding process may be forwarded to the metadata parser.

The metadata parser can parse/decode the 360-degree video-related metadata. The metadata parser can forward acquired metadata to the data decapsulation processor, the data decoder, the re-projection processor and/or the renderer.

The re-projection processor can perform re-projection on the decoded 360-degree video data. The re-projection processor can re-project the 360-degree video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360-degree video data corresponding to a specific area of the 3D space on the 3D space using metadata necessary for re-projection.

The renderer can render the re-projected 360-degree video data. As described above, re-projection of 360-degree video data on a 3D space may be represented as rendering of 360-degree video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360-degree video through a VR display or the like. The VR display is a device which reproduces a 360-degree video and may be included in a 360-degree video reception device (tethered) or connected to the 360-degree video reception device as a separate device (un-tethered).

According to an example of the 360-degree video reception device according to the present embodiment, the 360-degree video reception device may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360-degree video transmission device.

As described above, the feedback information may be consumed at the reception side as well as being transmitted to the transmission side. The reception side feedback processor may forward the acquired feedback information to internal elements of the 360-degree video reception device such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360-degree video reception device according to the present embodiment may be hardware elements. According to an example, the internal/external elements may be changed, omitted, replaced by other elements or integrated. According to an example, additional elements may be added to the 360-degree video reception device.

Figure 7:
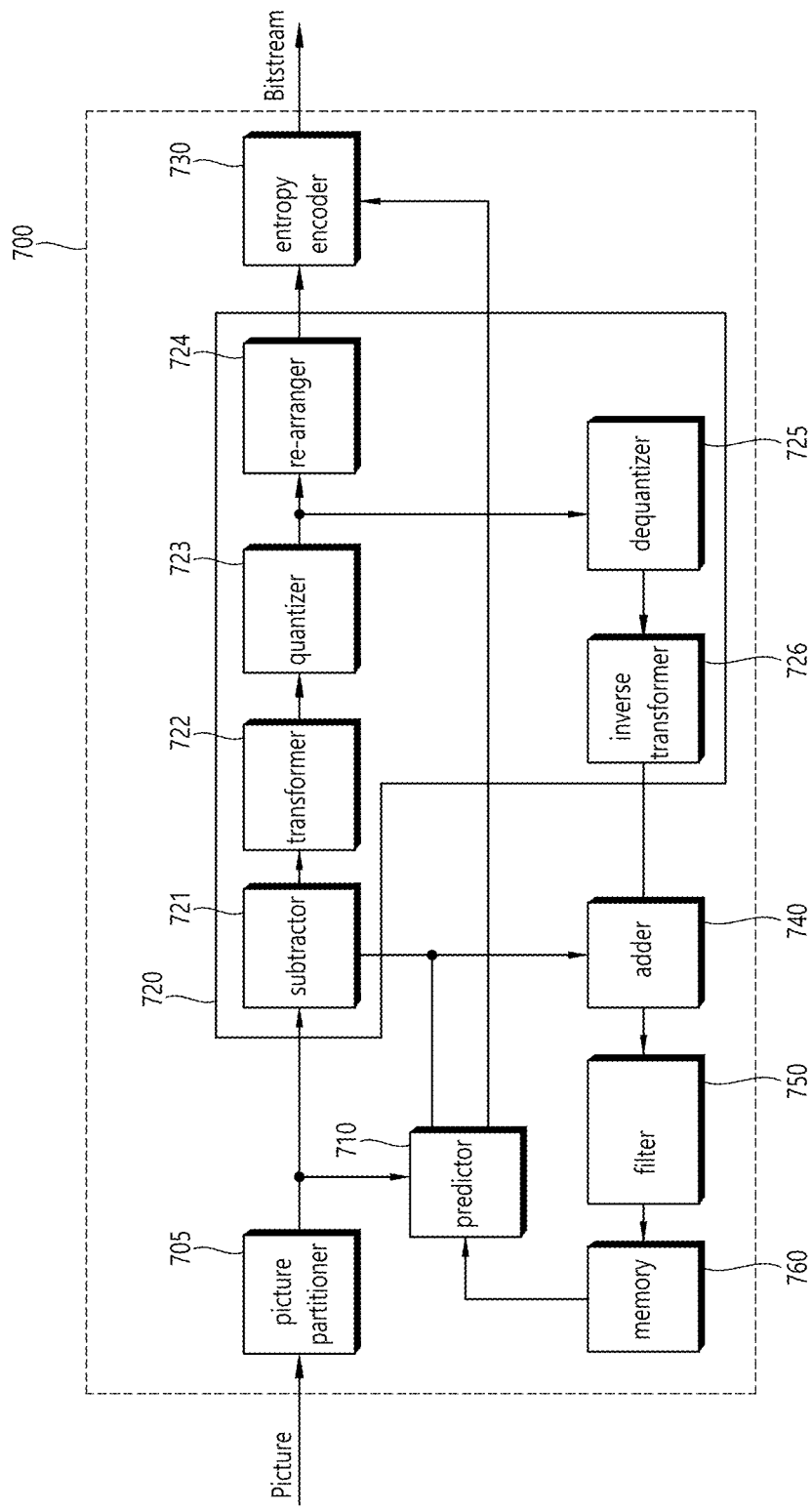
FIG. 7 is a view illustrating a configuration of a data encoder according to the present embodiment.

FIG. 7 is a view illustrating a configuration of a data encoder according to the present embodiment. For example, the data encoder according to the present disclosure can perform various encoding schemes including a video/image encoding scheme according to high efficiency video codec (HEVC).

Referring to FIG. 7, a data encoder (700) may include a picture partitioner (705), a predictor (710), a residual processor (720), an entropy encoder (730), an adder (740), a filter (750), and a memory (760). The residual processor (720) may include a subtractor (721), a transformer (722), a quantizer (723), a re-arranger (724), a dequantizer (725), and an inverse transformer (726).

The picture partitioner (705) may partition an input image to at least one processing unit. A unit represents a basic unit of image processing. A unit may include at least one of a specific area of the picture and information related to the corresponding area. In some cases, the term unit may be interchangeably used with the terms block or area. In a general case, an M×N block may represent a set of samples or transform coefficients being configured of M number of columns and N number of rows.

For example, a processing unit may also be referred to as a coding unit (CU). In this case, a coding unit may be recursively divided (or segmented) from a largest coding unit (LCU) according to a Quad-tree binary-tree (QTBT) structure. For example, one coding unit may be split to a plurality of coding units of a deeper depth based on a Quad-tree structure and/or a Binary-tree structure. In this case, for example, the Quad-tree structure may be applied first and the Binary-tree structure may be applied afterwards. Alternatively, the Binary-tree structure may be applied first. A coding procedure according to the present disclosure may be performed based on a final coding unit that can no longer be split. In this case, based on a coding efficiency according to the image properties, the largest coding unit may be directly used as the final coding unit, or the coding unit may be recursively split to coding units of a deeper depth as needed so that a coding unit of an optimal size can be used as the final coding unit. Herein, a coding procedure may include procedures of prediction, transform, reconstruction, and so on.

As another example, a processing unit may also include a coding unit (CU), a prediction unit (PU), or a transform unit (TU). A coding unit may be recursively split to coding units of a deeper depth from a largest coding unit (LCU) according to a Quad-tree structure. In this case, based on a coding efficiency according to the image properties, the largest coding unit may be directly used as the final coding unit, or the coding unit may be recursively split to coding units of a deeper depth as needed so that a coding unit of an optimal size can be used as the final coding unit. In case a smallest coding unit (SCU) is configured, the coding unit cannot be split to a coding unit that is smaller than the smallest coding unit. Herein, a final coding unit indicates a coding unit that is a basis of partitioning or splitting to a prediction unit or transform unit. As a unit being partitioned from a coding unit, the prediction unit may be a unit of a sample prediction. At this point, a prediction unit may be divided to sub blocks. A transform unit may be split from a coding unit according to a Quad tree structure, and the transform unit may be a unit deriving a transform coefficient, and/or the transform unit may be a unit deriving a residual signal from the transform coefficient. Hereinafter, a coding unit may also be referred to as a coding block (CB), a prediction unit may also be referred to as a prediction block (PB), and a transform unit may also be referred to as a transform block (TB). A prediction block or prediction unit may mean a specific area having a block-shape within a picture, and a prediction block may include an array of prediction samples. Additionally, a transform block or transform unit may mean a specific area having a block-shape within a picture, and a transform block may include an array of transform coefficients residual samples.

The predictor (710) may perform prediction on a processing object block (hereinafter referred to as a current block) and may generate a predicted block including prediction samples for the current block. A unit of prediction being performed by the predictor (710) may be a coding block, or may be a transform block, or may be a prediction block.

The predictor (710) may determine whether intra prediction is applied or whether inter prediction is applied to the current block. For example, the predictor (710) may determine whether intra prediction or inter prediction is applied in CU units.

In case of intra prediction, the predictor (710) may derive a prediction sample for the current block based on a reference sample outside of the current block within the picture (hereinafter referred to as current picture). At this point, the predictor (710) may (i) derive a prediction sample based on an average or interpolation of neighboring reference samples of the current block, and (ii) also derive the prediction sample based on a reference sample existing along a specific (prediction) direction for a prediction sample among the neighboring reference samples of the current block. The case of (i) may be referred to as a non-directional mode or a non-angular mode, and the case of (ii) may be referred to as a directional mode or an angular mode. In intra prediction, the prediction mode may, for example, have 33 or more directional prediction modes and at least 2 or more non-directional modes. A non-directional mode may include a DC prediction mode and a Planar mode. The predictor (710) may determine a prediction mode being applied to the current block by using the prediction mode applied to the neighboring blocks.

In case of inter prediction, the predictor (710) may derive a prediction sample for the current block based on a sample that is specified by a motion vector on a reference picture. The predictor (710) may derive a prediction sample for the current block by applying one of a skip mode, a merge mode, and a motion vector prediction (MVP) mode. In case of the skip mode and the merge mode, the predictor (710) may use motion information of a neighboring block as the motion information of the current block. In case of the skip mode, unlike the merge mode, a difference (residual) between a prediction sample and an original sample is not transmitted. In case of the MVP mode, the motion vector of the current block may be derived by using a motion vector of the current block as the predictor by using a motion vector of a neighboring block as a motion vector predictor.

In case of inter prediction, a neighboring block may include a spatial neighboring block existing in the current picture and a temporal neighboring block existing in a reference picture. A reference picture including the temporal neighboring block may also be referred to as a collocated picture (colPic). Motion information may include a motion vector and a reference picture index. Information, such as prediction mode information and motion information, and so on, may be (entropy) encoded and outputted in a bitstream format.

In case motion information of a temporal neighboring block is used in the skip mode and the merge mode, an uppermost picture on a reference picture list may be used as a reference picture. Reference pictures being included in a Picture Order Count may be arranged based on a Picture Order Count (POC) difference between a current picture and the corresponding reference picture. The POC may correspond to a display order of pictures and may be differentiated from a coding order.

The subtractor (721) generates a residual sample, which is a difference between an original sample and a prediction sample. In case of the skip mode, a residual sample may not be generated as described above.

The transformer (722) generates a transform coefficient by transforming a residual sample to transform block units. The transformer (722) may perform transform in accordance with a size of the corresponding transform block and a prediction mode applied to a coding block or prediction block that spatially overlays with the corresponding transform block. For example, in case intra prediction is applied to the coding block or the prediction block that spatially overlays with the corresponding transform block, and in case the transform block is a 4×4 residual array, the residual sample may be transformed by using a Discrete Sine Transform (DST) transform kernel, and, in other cases, the residual sample may be transformed by using a Discrete Cosine Transform (DCT) transform kernel.

The quantizer (723) may quantize transform coefficients and may then generate quantized transform coefficients.

The re-arranger (724) rearranges the quantized transform coefficients. The re-arranger (724) may perform a scanning method of the coefficients and may rearrange the block-formed quantized transform coefficients to a one-dimensional vector format. Herein, although the re-arranger (724) is described as a separate component, the re-arranger (724) may be a part of the quantizer (723).

The entropy encoder (730) may perform entropy encoding on the quantized transform coefficients. The entropy encoding may, for example, include encoding methods, such as exponential Golomb, context-adaptive variable length coding (CAVLC), context-adaptive binary arithmetic coding (CABAC), and so on. In addition to the quantized transform coefficients, the entropy encoder (730) may encode information needed for video reconstruction (e.g., syntax element value, and so on) together or separately. The entropy encoded information may be transmitted or stored in a bitstream format in network abstraction layer (NAL) units.

The dequantizer (725) dequantizes the values quantized by the quantizer (723) (the quantized transform coefficients), and the inverse transformer (726) performs inverse transform on the values dequantized by the dequantizer (725) and generates a residual sample.

The adder (740) reconstructs a picture by adding the residual sample and the prediction sample. The residual sample and the prediction sample may be added to form a block unit, which are then generated as a reconstruction block. Herein, although the adder (740) is described as a separate component, the adder (740) may be a part of the predictor (710). Meanwhile, the adder (740) may also be referred to as a reconstructor or a reconstruction block generator.

For a reconstructed picture, the filter (750) may apply a de-blocking filter and/or a sample adaptive offset. By using the de-blocking filter and/or the sample adaptive offset, artifacts on a block boundary within the reconstructed picture and distortion occurring during the quantization process may be corrected. The sample adaptive offset may be applied in sample units, and this may be applied after the de-blocking filtering process is completed. The filter (750) may also apply an Adaptive Loop Filter (ALF) to the reconstructed picture. The ALF may be applied to the reconstructed picture after the de-blocking filter and/or the sample adaptive offset are/is applied.

The memory (760) may store the reconstructed picture (decoded picture) and/or information needed for encoding/decoding. Herein, the reconstructed picture may be a reconstructed picture having the filtering processed completed by the filter (750). The stored reconstructed picture may be used as a reference picture for (inter) prediction of a different picture. For example, the memory (760) may store (reference) pictures being used in inter prediction. At this point, the pictures that are used in inter prediction may be designated by a reference picture set or a reference picture list.

Figure 8:
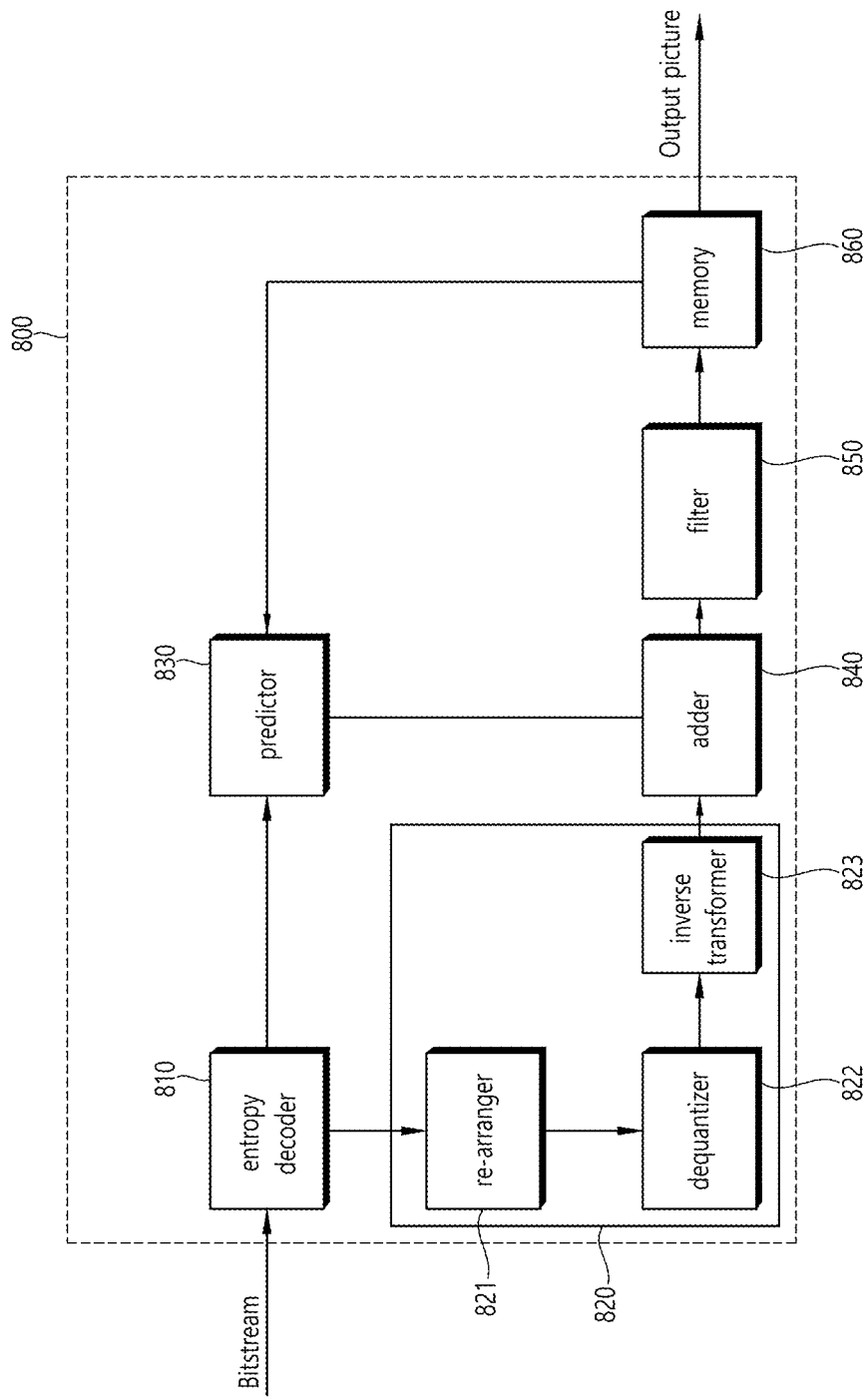
FIG. 8 is a view illustrating a configuration of a data decoder according to the present embodiment.

FIG. 8 is a view illustrating a configuration of a data decoder according to the present embodiment.

Referring to FIG. 8, the data decoder (800) includes an entropy decoder (810), a residual processor (820), a predictor (830), an adder (840), a filter (850), and a memory (860). Here, the residual processor (820) may include a re-arranger (821), a dequantizer (822), and an inverse transformer (823).

When a bitstream including video information is inputted, a video decoder (800) may perform reconstruction of a video corresponding to a process in which video information is processed by a video encoder.

For example, the video decoder (800) may perform video decoding by using a processing unit applied to the video encoder. Therefore, a processing unit block of video decoding may, for example, a coding unit, and, in another example, the processing unit block may be a coding unit, a prediction unit, or a transform unit. A coding unit may be split from a largest coding unit in accordance with a Quad-tree structure and/or a Binary-tree structure.

In some cases, the prediction unit and the transform unit may be further used, and, in such case, as a block being derived or partitioned from the coding unit, a prediction block may be a unit of sample prediction. At this point, the prediction unit may be split (or divided) to sub-blocks. A transform unit may be split from a coding unit in accordance with a Quad-tree structure, and the transform unit may be a unit deriving a residual signal from a unit deriving a transform coefficient or from a transform coefficient.

The entropy decoder (810) may parse a bitstream and may output information needed for video reconstruction or picture reconstruction. For example, the entropy decoder (810) may decode information in the bitstream based on a coding method, such as exponential Golomb, CAVLC or CABAC, and so on, and may output syntax element values that are needed for video reconstruction, quantized values of transform coefficients related to a residual, and so on.

More specifically, the CABAC entropy decoding method may receive a bin corresponding to each syntax element in the bitstream, determine a context model by using decoding subject syntax element information and decoding information of neighboring and decoding subject blocks or information on a decoded symbol/bin of a previous process step, predict an occurrence likelihood of a bin in accordance with the determined context model and perform arithmetic decoding of a bin, and, then, generate a symbol corresponding to each syntax element. At this point, after determining the context model, the CABAC entropy decoding method may update the context model by using information on a decoded symbol/bin being decoded for a syntax model of a next symbol/bin.

Among the information decoded by the entropy decoder (810), information related to prediction may be provided to the predictor (830), and residual values, i.e., quantized transform coefficients, being processed with entropy decoding by the entropy decoder (810) may be inputted to the re-arranger (821).

The re-arranger (821) may rearrange the quantized transform coefficients to a two-dimensional (2D) block format. The re-arranger (821) may perform rearrangement as a process corresponding to coefficient scanning, which is performed in the encoder (or encoding device). Herein, although the re-arranger (821) is described as a separate component, the re-arranger (821) may be a part of the dequantizer (822).

The dequantizer (822) may dequantize the quantized transform coefficients based on a (de-)quantization parameter and may output the transform coefficients. At this point, information for deriving the quantization parameter may be signaled from the encoder (or encoding device).

The inverse transformer (823) may perform inverse transform on the transform coefficients and may derive residual samples.

The predictor (830) may perform prediction on a current block and may generate a predicted block including prediction samples for the current block. A prediction unit being performed by the predictor (830) may be a coding block, or may be a transform block, or may be a prediction block.

The predictor (830) may determine whether to apply intra prediction or to apply inter prediction based on information on the prediction. At this point, a unit determining which one of intra prediction or inter prediction is to be applied and a unit generating a prediction sample may be different. Moreover, in inter prediction and intra prediction, a unit generating a prediction sample may also be different. For example, whether inter prediction is to be applied or whether intra prediction is to be applied may be determined in CU units. Additionally, for example, in inter prediction, a prediction mode may be determined in PU units and a prediction sample may be generated, and, in intra prediction, the prediction mode may be determined in PU units, and the prediction sample may also be generated in TU units.

In case of intra prediction, the predictor (830) may derive a prediction sample for the current block based on a neighboring reference sample within the current picture. The predictor (830) may derive a prediction sample for the current block by applying a directional mode or a non-directional mode based on the neighboring reference sample of the current block. At this point, the prediction mode that is to be applied to the current block may be determined by using an intra prediction mode of a neighboring block.

In case of inter prediction, the predictor (830) may derive a prediction sample for the current block based on a sample that is specified by a motion vector on a reference picture. The predictor (830) may derive a prediction sample for the current block by applying one of a skip mode, a merge mode, and a MVP mode. At this point, motion information needed for the inter prediction of the current block being provided by the video encoder, e.g., information on a motion vector, reference picture index, and so on, may be acquired or derived based on information on the prediction.

In case of the skip mode and the merge mode, motion information of a neighboring block may be used as the motion information of the current block. At this point, a neighboring block may include a spatial neighboring block and a temporal neighboring block.

The predictor (830) may configure a merge candidate list by using motion information of an available neighboring block, and information indicated by the merge index in the merge candidate list may be used as the motion vector of the current block. The merge index may be signaled from the encoder (or encoding device). Motion information may include a motion vector and a reference picture. In case motion information of a temporal neighboring block is used in the skip mode and the merge mode, an uppermost picture on a reference picture list may be used as a reference picture.

In case of the skip mode, unlike the merge mode, a difference (residual) between a prediction sample and an original sample is not transmitted.

In case of the MVP mode, the motion vector of the current block may be derived by using a motion vector of the current block as the predictor by using a motion vector of a neighboring block as a motion vector predictor. At this point, a neighboring block may include a spatial neighboring block and a temporal neighboring block.

For example, in case the merge mode is applied, by using a motion vector of a reconstructed spatial neighboring block and/or a motion vector corresponding to a Col block, which is a temporal neighboring block, a merge candidate list may be generated. In the merge mode, a motion vector of a candidate block selected from the merge candidate list is used as the motion vector of the current block. The information on the prediction may include a merge index indicating a candidate block having an optimal motion vector, which is selected from the candidate blocks included in the merge candidate list. At this point, the predictor (830) may derive the motion vector of the current block by using the merge index.

As another example, in case the Motion Vector Prediction (MVP) mode is applied, by using a motion vector of a reconstructed spatial neighboring block and/or a motion vector corresponding to a Col block, which is a temporal neighboring block, a motion vector predictor candidate list may be generated. More specifically, a motion vector of a reconstructed spatial neighboring block and/or a motion vector corresponding to a Col block, which is a temporal neighboring block, may be used as a motion vector candidate. The information on the prediction may include a prediction motion vector index indicating an optimal motion vector, which is selected among the motion vector candidates included in the list. At this point, the predictor (830) may use the motion vector index and may select a prediction motion vector of the current block, among the motion vector candidates included in the motion vector candidate list. The predictor of the encoder may acquire a motion vector difference (MVD) between the motion vector of the current block and the motion vector predictor, and the acquired MVD may be encoded and outputted as a bitstream. In other words, the MVD may be acquired as a value, which is obtained by subtracting the motion vector predictor from the motion vector of the current block. At this point, the predictor (830) may acquire a motion vector difference included in the information on the prediction, and the motion vector of the current block may be derived by adding the motion vector difference and the motion vector predictor. The predictor may also acquire or derive a reference picture index, and so on, which indicates a reference picture, from information on the prediction.

The adder (840) may reconstruct the current block or the current picture by adding a residual sample and a prediction sample. The adder (840) may also reconstruct the current picture by adding a residual sample and a prediction sample in block units. In case the skip mode is applied, since a residual is not transmitted, a prediction sample may be the reconstructed sample. Herein, although, the adder (840) is described as a separate component, the adder (840) may be a part of the predictor (830). Meanwhile, the adder (840) may also be referred to as a reconstructor or a reconstruction block generator.

The filter (850) may apply deblocking filtering sample adaptive offset, and/or ALF, and so on, to the reconstructed picture. At this point, the sample adaptive offset may be applied in sample units and may also be applied after deblocking filtering. The ALF may also be applied after deblocking filtering and/or sample adaptive offset.

The memory (860) may store the reconstructed picture (decoded picture) or information needed for decoding. Herein, the reconstructed picture may be a reconstructed picture having the filtering processed completed by the filter (850). For example, the memory (860) may store pictures being used in inter prediction. At this point, the pictures that are used in inter prediction may be designated by a reference picture set or a reference picture list. The reconstructed picture may be used as a reference picture for a different picture. Additionally, the memory (860) may also output the reconstructed picture in accordance with an output order.

Figure 9:
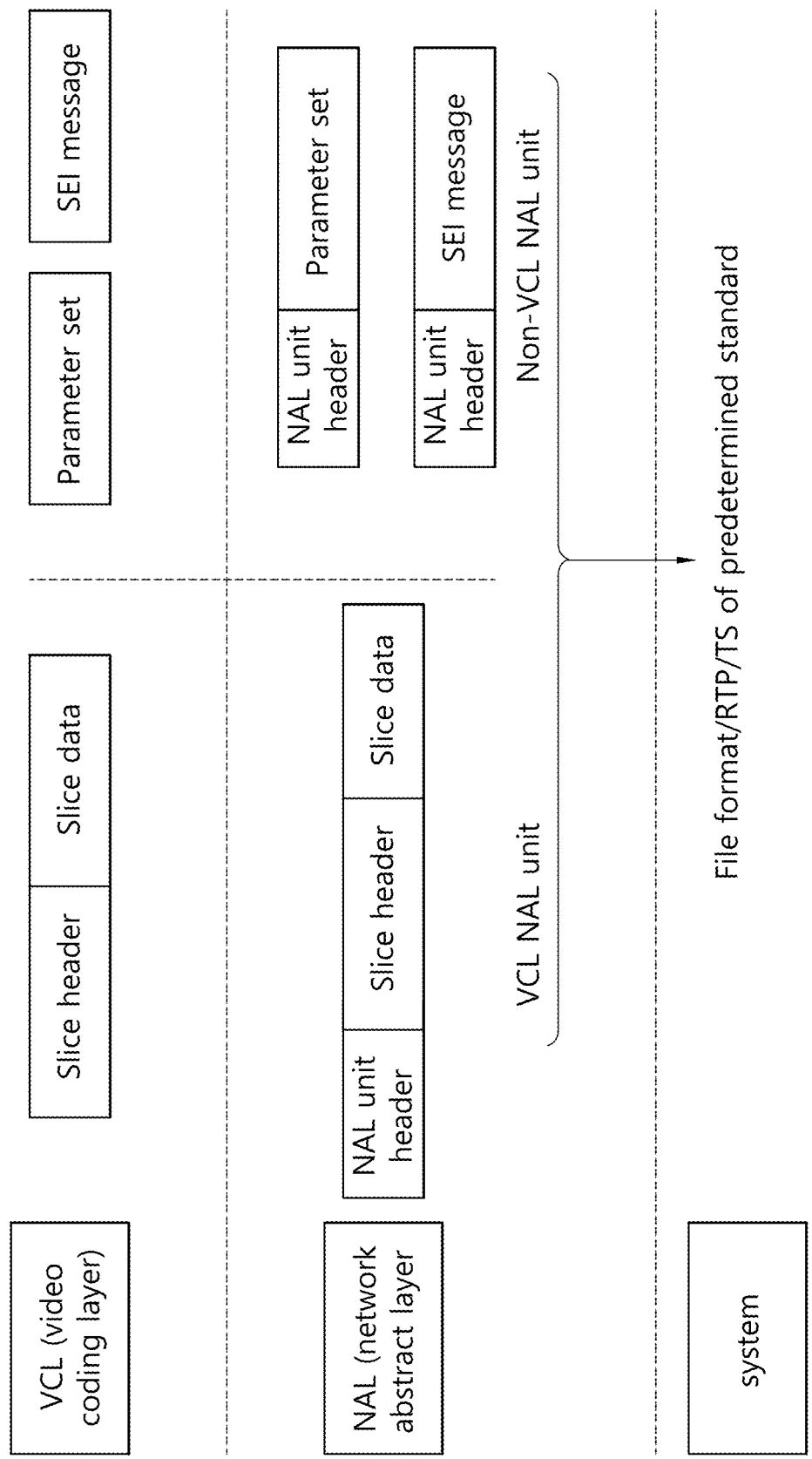
FIG. 9 shows an exemplary hierarchical structure for coded data.

FIG. 9 shows an exemplary hierarchical structure for coded data.

Referring to FIG. 9, coded data may be divided into a video coding layer (VCL) handling coding processing of a video/image and the video/image itself and a Network abstraction layer (NAL) storing and transmitting data of the coded video/image and being positioned between the video coding layer (VCL) and a lower system.

A NAL unit, which is a basic unit of the NAL, performs a function of mapping the coded image to a bit sequence of a lower system, such as a file format, a Real-time Transport Protocol (RTP), a Transport Stream (TS), and so on, according to a predetermined specification.

Meanwhile, in the VCL, a Supplemental enhancement information (SEI) message, which is supplementally needed in a related procedure, such as display, and so on, of the coding processing of a parameter set (a picture parameter set (PPS), a sequence parameter set (SPS), a video parameter set (VPS), and so on) corresponding to a header of a sequence and a picture, and so on, and a video/image, is separated from information on the video/image (slice data). The VCL including the information on the video/image is configured of slice data and a slice header.

As shown in the drawing, a NAL unit is configured of two parts: a NAL unit header and a Raw Byte Sequence Payload (RBSP) generated in the VCL. The NAL unit header includes information on a type of the corresponding NAL unit.

A NAL unit is divided into a VCL NAL unit and a non-VCL NAL in accordance with an RBSP generated in the VCL. The VCL NAL unit refers to a NAL unit including information on a video/image, and the non-VCL NAL unit represents a NAL unit including information that is needed for coding the video/image (parameter set or SEI message). The VCL NAL unit may be divided into various types in accordance with the nature and types of a picture being included in the corresponding NAL unit.

The present disclosure may be related to a method for transmitting a 360-degree video and a method for receiving a 360-degree video. The method for transmitting/receiving a 360-degree video according to the present disclosure may be respectively performed by a 360-degree video transmitting/receiving device according to the present disclosure or embodiments of the corresponding devices.

The above-described 360-degree video transmitting/receiving device, each embodiment of the transmitting/receiving device, and each embodiment of internal/external elements of the corresponding device (s) may be combined. For example, the embodiments of the projection processor may be combined with the embodiments of the data encoder, thereby being capable of configuring a number of embodiments of the 360-degree video transmitting device equivalent to the number of cases for combining the embodiments. The combined embodiments may also be included in the scope of the present disclosure.

According to the present disclosure, area-based independent processing may be supported for an efficient processing based on a user's viewpoint. For this, an independent bitstream may be configured by extracting and/or processing a specific area of an image, and a file format may be configured for the specific area extraction and/or processing. In this case, initial coordinate information of the extracted area may be signaled, thereby enabling efficient image area decoding and rendering to be supported in the receiving end. Hereinafter, an area in which independent processing of an input image is supported may include a motion constraint tile set (MCTS). For example, in order to support independent processing, motion estimation/motion compensation may be restricted (or limited) to within an MCTS area. More specifically, in case inter prediction for blocks within a specific MCTS is performed during the encoding/decoding process(es), the blocks within the corresponding specific MCTS may be restricted (or limited) to refer only to the respective MCTS of a reference picture for the motion estimation/motion compensation. For example, an MCTS may include at least one tile, and a tile may represent a rectangular area being configured of coding tree blocks (CTBs) of a 2D picture. A tile may be divided based on a specific tile row and a specific tile column within a picture. For example, in the above-described inter prediction, spatial neighboring blocks being considered when deriving motion information of a subject block may be viewed as being available in case the spatial neighboring blocks are included in the same tile as the subject block. An input image may be divided into multiple MCTS areas, and the MCTS areas may, for example, i) be encoded based on the same resolution and different qualities and bit rates, and ii) be encoded based on different resolutions.

Figure 10:
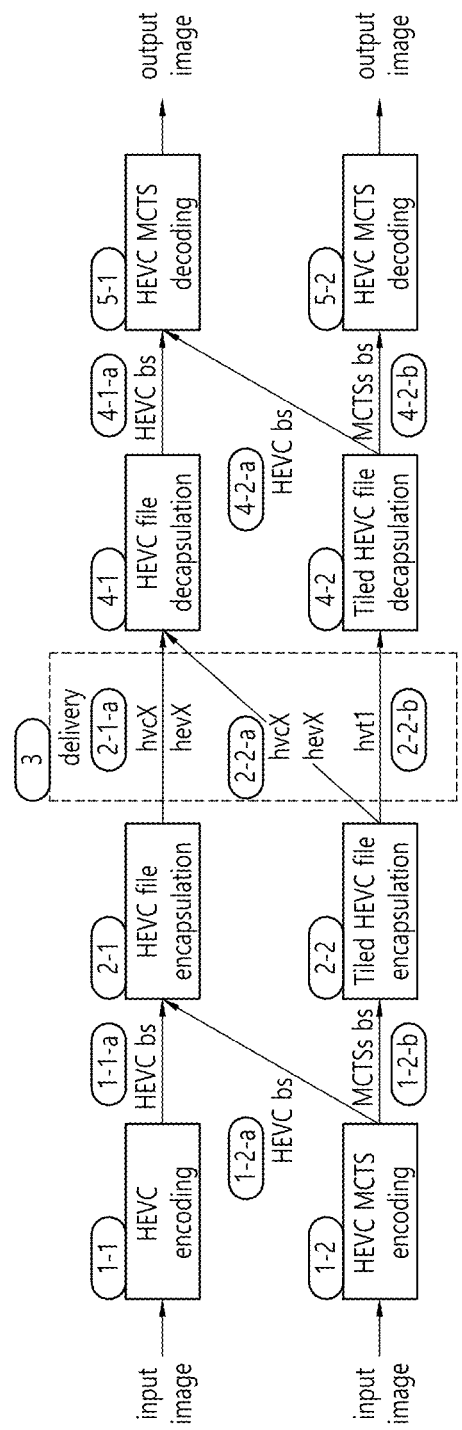
FIG. 10 shows an exemplary MCTS extraction and transport (or delivery) process as an example of area-based independent processing.

FIG. 10 shows an exemplary MCTS extraction and transport (or delivery) process as an example of area-based independent processing.

Referring to FIG. 10, a transmitting device (or transmitter) encodes an input image. Herein, the input image may correspond to the above-described projected picture or packed picture.

For example, the transmitting device may encode an input image in accordance with, for example, a general HEVC encoding procedure (1-1). In this case, the input image may be encoded and outputted as an HEVC bitstream (HEVC bs) (1-1-*a*).

As another example, an input image may be processed with an area-based independent encoding (HEVC MCTS encoding) (1-2). Accordingly, an MCTS stream for a plurality of areas may be outputted (1-2-*b*). Alternatively, part of the areas may be extracted from the MCTS stream and may then be outputted as an HEVC bitstream (1-2-*a*). In this case, a whole information for the decoding and reconstruction of part of the area is included in the bitstream, and, accordingly, in the receiving end, the part of the areas may be wholly reconstructed based on one bitstream for the part of the areas. The MCTS stream may be referred to as an MCTS (sub) bitstream.

The transmitter (or transmitting device) may encapsulate the encoded HEVC bitstream, which is encoded according to (1-1-*a*) or (1-2-*a*), to a track within a file for storage and transmission (2-1), and may deliver the encapsulated track to a receiver (or receiving device) (2-1-*a*). In this case, the corresponding track may, for example, be indicated as an identifier, such as, for example, hvcX, hevX, and so on.

Meanwhile, the transmitting device may encapsulate an encoded MCTS stream, which is encoded according to (1-2-*b*), to a file for storage and transmission (2-2). For example, the transmitting device may encapsulate MCTSs for independent processing to individual tracks and may then deliver (or transport) the encapsulated tracks (2-2-*b*). At this point, a base track for the processing of the entire MCTS stream or information, such as an extractor track, and so on, for extracting and processing part of the MCTS area may be included together in the file. In this case, the individual track may, for example, be indicated as an identifier, such as hvcX, hevX, and so on. As another example, the transmitting device may encapsulate a file including a track for an MCTS area by using the extractor track and may deliver (or transport) the encapsulated file (2-2-*a*). More specifically, the transmitting device may extract and deliver a track corresponding to one MCTS. In this case, the corresponding track may be indicated, for example, as an identifier, such as hvt1, and so on.

The receiving device may receive a file according to (2-1-*a*) or (2-2-*a*) and may perform a decapsulation procedure (4-1) and may, then, derive an HEVC bitstream (4-1-*a*). In this case, the receiving device may decapsulate a track within the received file and may then derive a bitstream.

Meanwhile, the receiving device may receive a file according to (2-2-*b*) and may perform a decapsulation procedure (4-2) and may, then, derive an MCTS stream or an HEVC bitstream. For example, in case tracks of MCTSs corresponding to all areas and a base track is included in a file, the receiving device may extract the entire MCTS stream (4-2-*b*). As another example, in case an extractor file is included in a file, the receiving device may extract the corresponding MCTS track and decapsulate the extracted MCTS track so as to generate a (HEVC) bitstream (4-2-*a*).

The receiving device may decode a bitstream according to (4-1-*a*) or (4-2-*a*) and may then generate an output image (5-1). Herein, in case of decoding a bitstream according to (4-2-*a*), the output image may be an output image for part of the MCTS area of the output image. Alternatively, the receiving device may decode an MCTS stream according to (4-2-*b*) and may then generate an output image (5-2).

Figure 11:
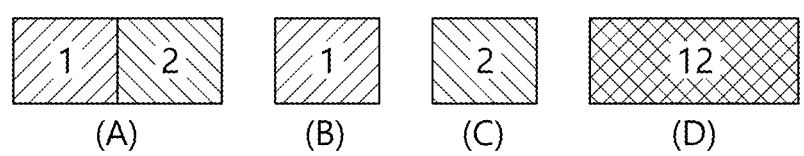
FIG. 11 shows an example of an image frame for an area-based independent processing support.

FIG. 11 shows an example of an image frame for an area-based independent processing support.

Referring to FIG. 11, one input image may be configured of two MCTS areas, left and right. A shape of an image frame being encoded/decoded by performing procedure 1-2 to 5-2, as described above in FIG. 10, may be the same as or correspond to part of (A) to (D) of FIG. 11.

In FIG. 11, (A) represents an image frame having both areas 1 and 2 and being available for independent/parallel processing of individual areas. (B) represents an independent image frame having only area 1 and half of a horizontal resolution. (C) represents an independent image frame having only area 2 and half of a horizontal resolution. (D) represents an image frame having both areas 1 and 2 and being available for processing without any support of independent/parallel processing of individual areas.

The bitstream configuration of 1-2-*b* and 4-2-*b* for deriving the above-described image frame may be the same as described below or may correspond to part of the following description.

Figure 12:
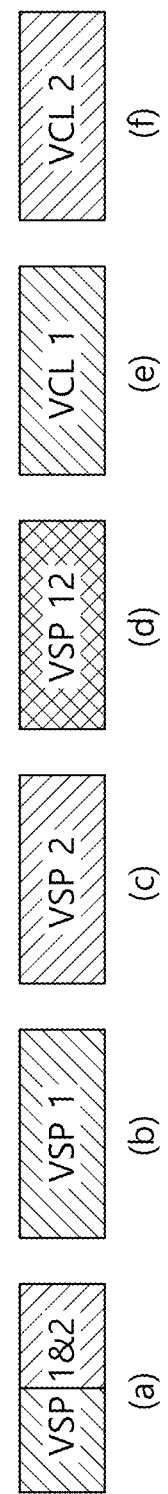
FIG. 12 shows an example of a bitstream configuration for an area-based independent processing support.

FIG. 12 shows an example of a bitstream configuration for an area-based independent processing support.

Referring to FIG. 12, VSP may represent VPS, SPS, and PPS, and VSP1 represents a VSP for area number 1, and VSP2 represents a VSP for area number 2, and VSP12 represents a VSP for both area number 1 and area number 2. Additionally, VCL1 represents a VCL for area number 1, and VCL2 represents a VCL for area number 2.

In FIG. 12, (a) represents Non-VCL NAL units (e.g., VPS NAL unit, SPS NAL unit, PPS NAL unit, and so on) for image frames being available for independent/parallel processing in both areas 1 and 2. (b) represents Non-VCL NAL units (e.g., VPS NAL unit, SPS NAL unit, PPS NAL unit, and so on) for image frames having only area 1 and having half of the resolution. (c) represents Non-VCL NAL units (e.g., VPS NAL unit, SPS NAL unit, PPS NAL unit, and so on) for image frames having only area 2 and having half of the resolution. (d) represents Non-VCL NAL units (e.g., VPS NAL unit, SPS NAL unit, PPS NAL unit, and so on) for image frames having both area 1 and area 2 and being available for processing without any support of independent/parallel processing of individual areas. (e) represents VCL NAL units of area 1. And, (f) represents VCL NAL units of area 2.

For example, in order to generate image frame (A), a bitstream including NAL units of (a), (e), (f) may be generated. In order to generate image frame (B), a bitstream including NAL units of (b), (e) may be generated. In order to generate image frame (C), a bitstream including NAL units of (c), (f) may be generated. In order to generate image frame (D), a bitstream including NAL units of (d), (e), (f) may be generated. In this case, information indicating the position of a specific area on a picture may be included in a bitstream for image frames, such as (B), (C), (D), and may then be delivered (or transported). In this case, the information may allow position information in an original frame of a selected area to be identified.

As shown in the case where only area 2 is selected (wherein the bitstream includes (c), (f) NAL units), in case the selected area is not positioned on an edge of a top left end, which is a reference point of the original image frame, a process of correcting a slice segment address of a slice segment header during a bitstream extraction process may follow.

Figure 13:
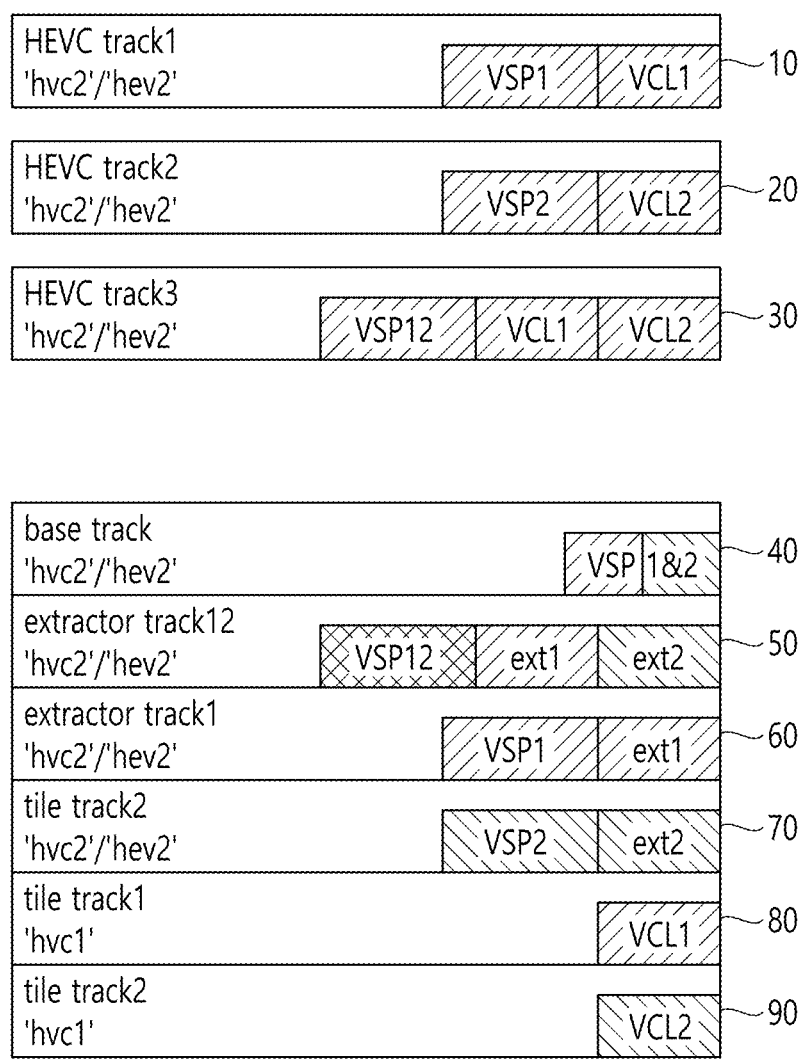
FIG. 13 shows an exemplary track configuration of a file according to the present disclosure.

FIG. 13 shows an exemplary track configuration of a file according to the present disclosure.

Referring to FIG. 13, in case encapsulation or coding is selectively performed for a specific area, as described above in 2-2-*a* or 4-2-*a* of FIG. 10, a related file configuration may include all or part of the following cases:

(1) a case where one track (10) includes NAL units of (b), (e), (2) a case where one track (20) includes NAL units of (c), (f), (3) a case where one track (30) includes NAL units of (d), (e), (f).

Additionally, the related file configuration may also include all of the following tracks or a combination of part of the following tracks:

(4) a base track (40) including (a)

(5) an extractor track (50) including (d) and having an extractor (e.g., ext1, ext2) for accessing (e) and (f)

(6) an extractor track (60) including (b) and having an extractor for accessing (e)

(7) an extractor track (70) including (c) and having an extractor for accessing (f)

(8) a tile track (80) including (e)

(9) a tile track (90) including (f)

A service provider may configure all of the above-described tracks, and, when performing transmission, only part of the tracks may be selected and combined and then transported.

For example, according to the present disclosure, a 360-degree video receiving device, may receive a bitstream being configured of VSP 1 & 2 or VSP12 and VCL1, VCL2 (i.e., a bitstream that can output an entire image) and may configure a sub-bitstream including part of the area (sub-picture) wanted by the 360-degree video receiving device (e.g., part of the area along a direction faced by a viewer in VR). And, at this point, a bitstream (sub bitstream) may be configured to be available for decoding in a standard decoder. And, for this, the corresponding bitstream (sub bitstream) may be configured to include a VCL NAL unit for an actual area of the sub-picture and a non-VCL NAL unit having a VSP including supplemental information that is needed for decoding the VCL NAL unit. For example, although VCL2 included in track 2 and VCL2 included in track 3 of FIG. 13 include information on the same image, due to a difference in the slice header, different information may be included in each track, and, according to the present disclosure, a track related to a sub-picture for a wanted area and related information for a smooth extraction of a sub bitstream and a slice (segment) header rearrangement may be configured and transported.

Meanwhile, an input image may be split to sub-picture sequences prior to encoding, and each sub-picture sequence may cover a subset of a spatial area of a 360-degree video content. Each sub-picture sequence may be independently encoded and outputted as a single-layer bitstream. Each sub-picture bitstream may be encapsulated in a file based on an individual track and may be processed with streaming. In this case, the receiving device may perform decoding and rendering on tracks covering the entire area, or the receiving device may perform decoding and rendering by selecting a track related to a specific sub-picture based on metadata related to orientation and viewport, and so on. The sub-picture may include one or multiple MCTSs. More specifically, the sub-picture may be configured to have an MCTS set format, and the MCTS set may include one or multiple MCTSs.

Meanwhile, in case a sub-picture includes multiple MCTSs, MCTS index information indicating an order of MCTSs for slice segment header adjustment may be signaled. In this case, a data decoder of the receiving device may identify a specific MCTS based on the MCTS index information. For example, the MCTS index information may be signaled in a syntax element format of dx_of_mcts_in_set [i][j][k] and the semantics may be, for example, as described below.

TABLE 1 idx_of_mcts_in_set[ i ][ j ][ k ] specifies the MCTS index of the k-th MCTS in the j-th MCTS set that is associated with the i-th extraction information set. The order index k represents the raster scan order of the k-th MCTSs in the j-th MCTS set where the width and the height of the output picture produced by the j-th MCTS set is provided by the associated activeSPS in the i-th extraction information set. The value of idx_of_mcts_in_set[ i ][ j ][ k ] shall be in the range of 0 to 511, inclusive.

More specifically, a syntax element of the idx_of_mcts_in_set[i][j][k] indicates an MCTS index of a k-th MCTS within a j-th MCTS set. The j-th MCTS set may indicate an MCTS set related to an i-th extraction information set. The extraction information set may indicate an MCTS set including MCTSs that shall be extracted for configuring an output picture. Herein, the output picture may correspond to the above-described sub-picture that is derived based on a 2D picture. The extraction information set may be included in the above-described SEI message. In this case, the SEI message may also be referred to as an extraction information set SEI message or an MCTS extraction information set SEI message. An output picture (sub-picture) having a specific width and height may be derived based on the j-th MCTS set, and an order index k indicates a k-th MCTS according to a raster scan order on the output picture (sub-picture) within the j-th MCTS set.

Meanwhile, the output picture may be configured by extracting an MCTS sub-bitstream for each MCTS. The output picture may be configured by using an MCTS within the MCTS set being indicated based on mctsSetIdxTarget information. An arrangement of the MCTSs on the output picture may be performed based on the raster scan order according to the above-described MCTS index information. For example, the arrangement of the MCTSs on the output picture may follow an index order of idx_of_mcts_in_set [mctsSetIdxTarget][mctsEisIdTarget][k]. Herein, the order index k indicates a raster scan order of the MCTSs on the output picture. The width and height of the output picture may be derived based on width information and height information of an active SPS. The width information and the height information may respectively correspond to a pic_width_in_luma_samples syntax element and a pic_height_in_luma_samples syntax element. The active SPS may be included in an output bitstream (outBitstream). The outBitstream may indicate a bitstream that is derived by encoding for the output picture. The outBitstream may include the above-described sub-picture bitstream.

Meanwhile, a replacement PPS may be configured for the above-described output picture (sub-picture), and, for each of the remaining VCL NAL units within the outBitstream, a slice segment header may be corrected as described below. A value of a slice_pic_parameter_set_id within the slice segment header may be configured to be equal to a value of a pps_pic_parameter_set_id. Herein, the slice_pic_parameter_set_id is included in the slice segment header and indicates an ID of a PPS that is related to the corresponding slice segment. The pps_pic_parameter_set_id is included in the replacement PPS and indicates an ID of the replacement PPS.

For example, in case 360-degree video data is projected as a 2D picture, a boundary of the 2D picture may be connected to another boundary of the 2D picture. And, accordingly, the output picture (sub-pictures) may include MCTSs that may be spatially spaced apart on a 2D picture but capable of covering their neighboring areas on a 3D spherical surface. In this case, the MCTSs may be rearranged based on a spatial correlation so as to configure the output picture (sub-picture). In this case, the order index k may indicate an order rank according to the raster scan order on the output picture (sub-picture), which is configured by rearrangement.

Meanwhile, in case the 360-degree video data is projected as a 2D picture, the output picture (sub-picture) may include MCTSs that may be spatially spaced apart on a 2D picture but capable of covering their neighboring areas on a 3D spherical surface. In this case, the MCTSs may be rearranged based on a spatial correlation so as to configure the output picture (sub-picture). In this case, the order index k may indicate an order rank according to the raster scan order on the output picture (sub-picture), which is configured by rearrangement.

Figure 14:
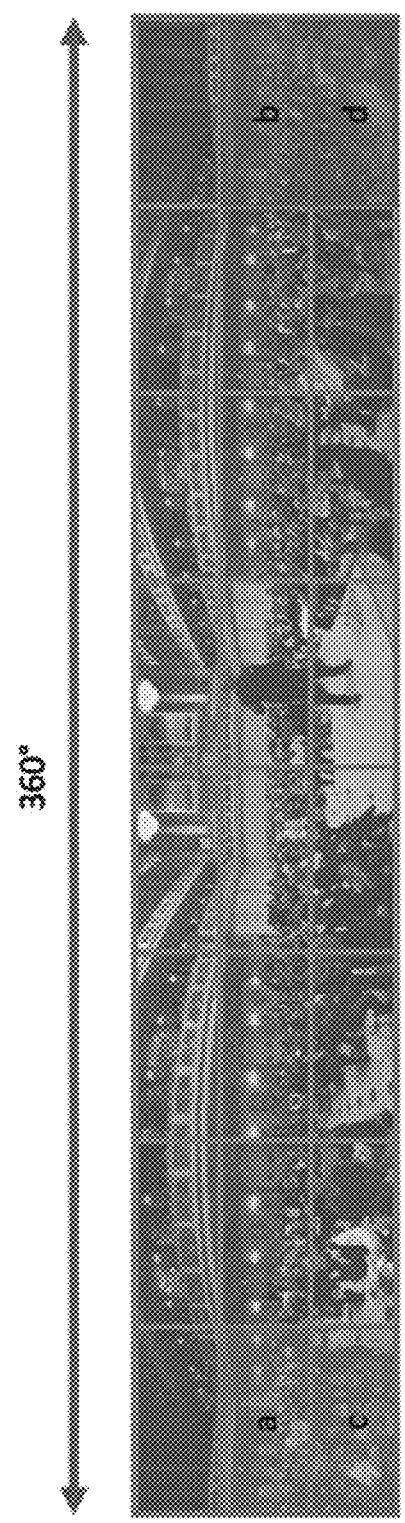
FIG. 14 shows a case of configuring a sub-picture by extracting areas of both ends of a cylinder surface according to the present disclosure.

FIG. 14 shows a case of configuring a sub-picture by extracting areas of both ends of a cylinder surface according to the present disclosure. The picture shown in FIG. 14 may represent a 2D picture having a cylinder-type projection scheme applied thereto.

Referring to FIG. 14, areas a, b, c, d of a 2D picture may be combined to configure a sub-picture. Although the areas a, c and the areas b, d are spatially spaced apart on the 2D picture, the areas may cover their neighboring areas on a 3D spherical surface. In case the areas a, b, c, d of a 2D picture are combined to configure a sub-picture, when considering the image arrangement, area b may represent a top left end area on the sub-picture, and area c may represent a bottom right end area on the sub-picture.

Therefore, in case a j-th MCTS set includes MCTSs corresponding to the areas, an MCTS index may be signaled as described below.

idx_of_mcts_in_set[$i$][$j$][0]=index $b$, idx_of_mcts_in_set[$i$][$j$][1]=index $a$, idx_of_mcts_in_set[$i$][$j$][2]=index $d$, idx_of_mcts_in_set[$i$][$j$][3]=index $c$ Herein, values of width information and height information may be given to an active SPS, which is included in an i-th extraction information set, as described below.

pic_width_in_luma_samples=width_$b$+width_$a$, pic_height_in_luma_samples=height_$b$+height_$d$ More specifically, a width of an output picture (sub-picture) is equal to a sum of a width of area b and a width of area a, and a height of an output picture (sub-picture) is equal to a sum of a height of area b and a height of area d.

In order to configure an outBitstream image, the receiving device may need to re-designate a slice segment address of a slice header. In this case, the receiving device may rearrange MCTSs by an order of b, a, d, c and positions (or arranges) MCTSs in a raster scan order according to a width given in pic_width_in_luma_samples. In this case, an output picture (sub-picture) may be configured, as shown below in FIG. 15, by arranging MCTSs b and a in a first row and by arranging MCTSs d and c in a second row.

Figure 15:
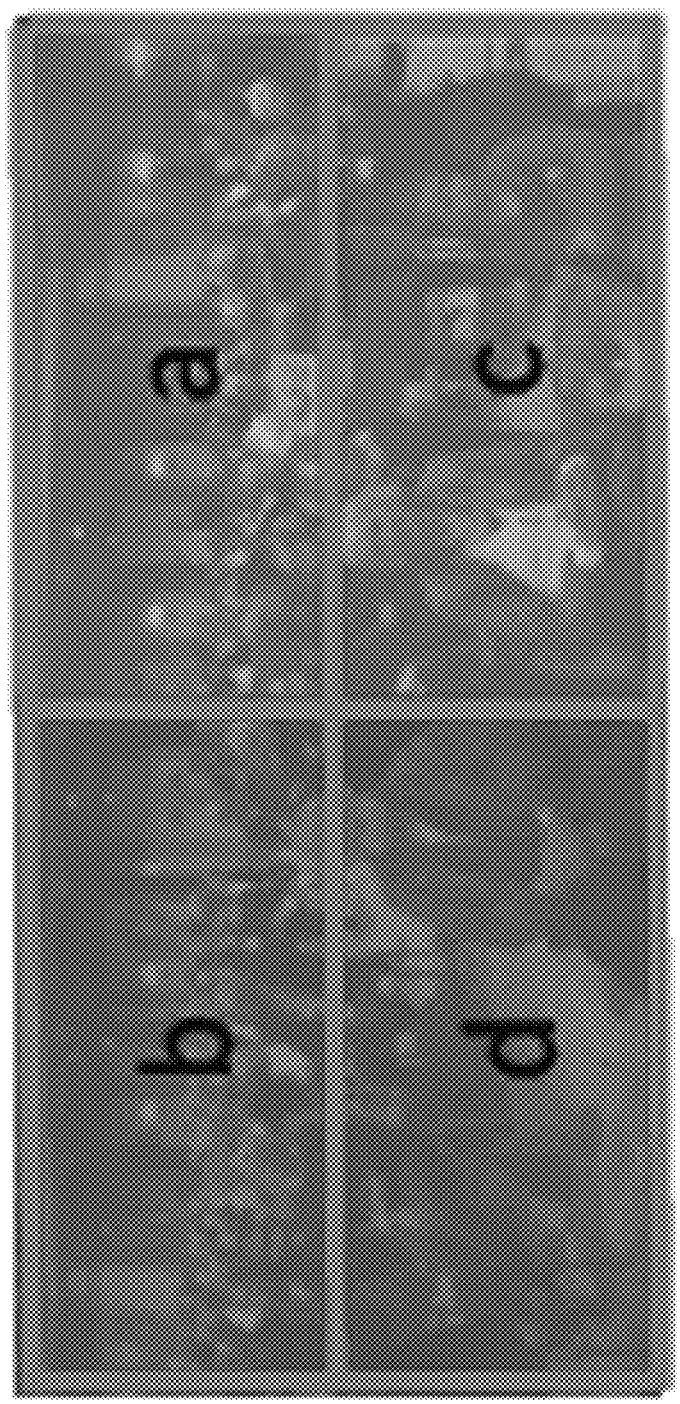
FIG. 15 shows an example of an output picture (sub-picture) including rearranged MCTSs.

FIG. 15 shows an example of an output picture (sub-picture) including rearranged MCTSs.

A receiving device re-designates the slice segment address within a slice header according to the order of the MCTSs.

Figure 16:
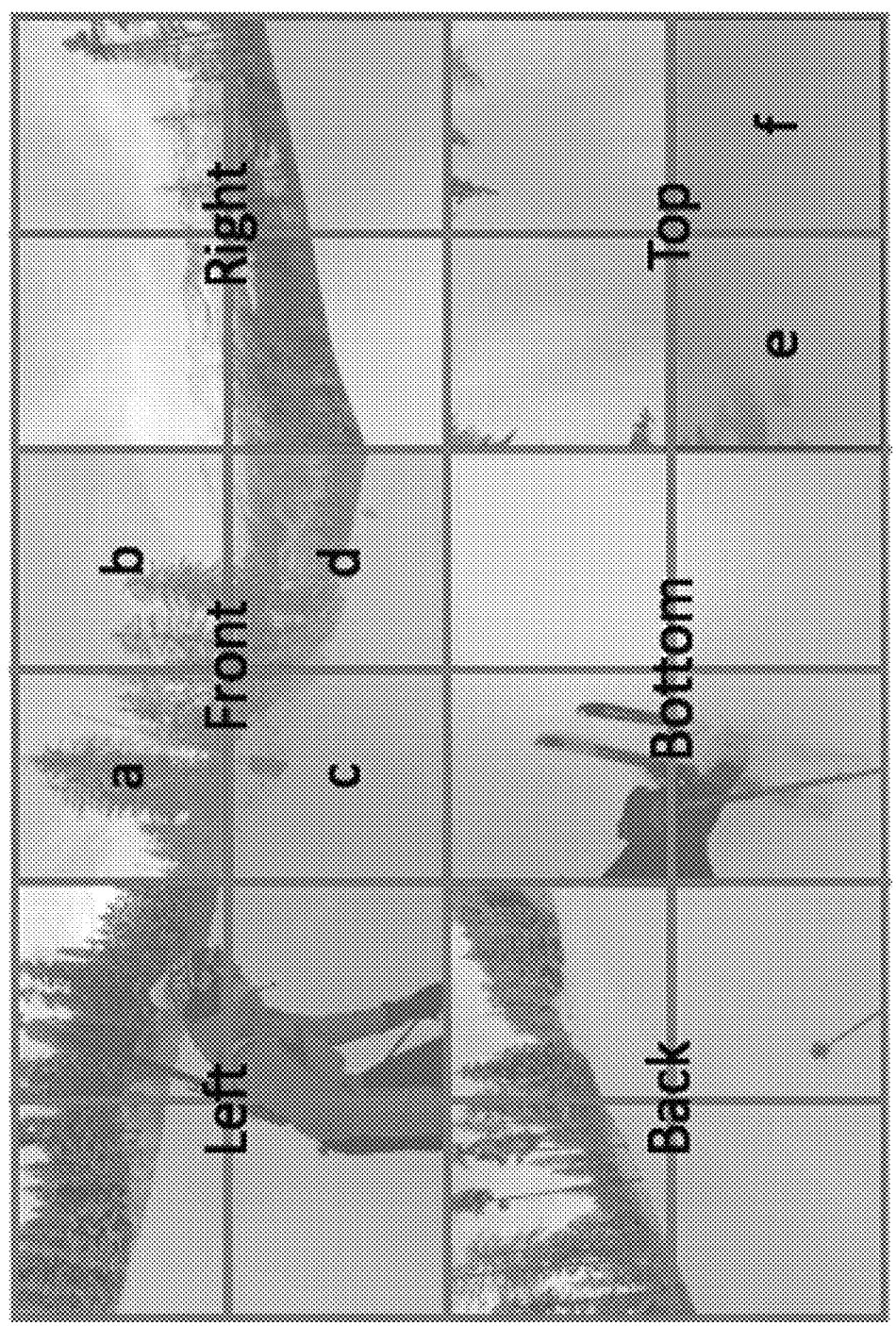
FIG. 16 shows a case of configuring a sub-picture by extracting areas of a 2D picture applying a cube map projection scheme according to another example of the present disclosure.

FIG. 16 shows a case of configuring a sub-picture by extracting areas of a 2D picture applying a cube map projection scheme according to another example of the present disclosure.

Referring to FIG. 16, areas a, b, c, d, e, f of a 2D picture may be combined to configure a sub-picture. Although the areas a, b, c, d and the areas e, f are spatially spaced apart on the 2D picture, the areas may cover their neighboring areas on a 3D spherical surface.

In case a j-th MCTS set includes MCTSs corresponding to the areas, an MCTS index may be signaled as described below.

idx_of_mcts_in_set[$i$][$j$][0]=index $e$, idx_of_mcts_in_set[$i$][$j$][1]=index $f$, idx_of_mcts_in_set[$i$][$j$][2]=index $a$, idx_of_mcts_in_set[$i$][$j$][3]=index $b$ idx_of_mcts_in_set[$i$][$j$][4]=index $c$, idx_of_mcts_in_set[$i$][$j$][5]=index $d$ Herein, values of width information and height information may be given to an active SPS, which is included in an i-th extraction information set, as described below.

pic_width_in_luma_samples=width_$e$+width_$f$, pic_height_in_luma_samples=height_$e$+height_$a$+height_$c$, More specifically, a width of an output picture (sub-picture) is equal to a sum of a width of area e and a width of area f, and a height of an output picture (sub-picture) is equal to a sum of a height of area e, a height of area a, and a height of area c.

In order to configure an outBitstream image, the receiving device may re-designate a slice segment address of a slice header. In this case, the receiving device may rearrange MCTSs by an order of e, f, a, b, c, d and positions (or arranges) MCTSs in a raster scan order according to a width given in pic_width_in_luma_samples. In this case, an output picture (sub-picture) may be configured, as shown below in FIG. 17, by arranging MCTSs e and f in a first row, by arranging MCTSs a and b in a second row, and by arranging MCTSs c and d in a third row.

Figure 17:
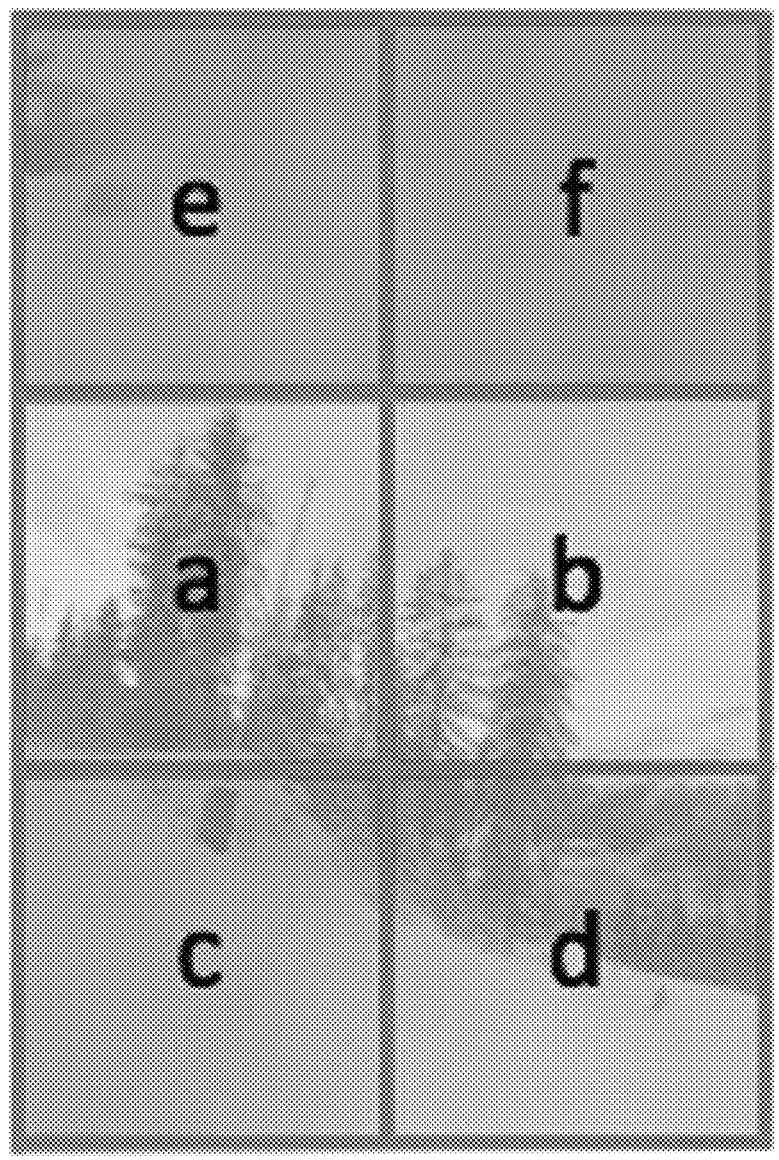
FIG. 17 shows another example of an output picture (sub-picture) including rearranged MCTSs.

FIG. 17 shows another example of an output picture (sub-picture) including realigned MCTSs.

A receiving device re-designates a slice segment address within a slice header according to an order of the MCTSs.

Meanwhile, when extracting a sub-bitstream for an output picture (sub-picture) covering part of an image portion by using information of an MCTS extraction information set SEI message, slice address replacement may be performed as shown below in Table 2 or Table 3.

TABLE 2

- For MCTSs whose mcts_id[ i ] equal to
  idx_of_mcts_in_set[ mctsEisIdTarget ][ mctsSetIdxTarget ][ 0 ], set colWidthOffsetInTiles
  and rowHeightOffsetInTiles equal to top_left_tile_index[ i ][ 0 ] %
  ( num_tile_columns_minus1 + 1 ) and top_left_tile_index[ i ][ 0 ] /
  ( num_tile_columns_minus1 + 1 ),respectively.

TABLE 2-continued

- Calculate ctbAddrColWidthOffset and ctbAddrRowHeightOffset which are the sum of colWidth[ j ] for j ranges from 0 to colWidlhOffsetInTiles and rowHeight[ j ] for j ranges from 0 to rowHeightOffsetInTiles, respectively, with the functions colWidth[ j ] and rowHeight[ j ] arc evoked from defined in 6.5.1 given the SPS and PPS of the input video stream.
- For each VCL NAL units in outBitstream, the following applies.
    - Set inCtbAddrColWidth and inCtbAddrRowHeight equal to slice segment address % PicWidthInCtbsY and slice segment address / PicWidthInCtbsY, respectively, given the SPS of the input video stream.
    - Set outCtbAddrColWidth and outCtbAddrRowHeight equal to (inCtbAddrColWidth − ctbAddrColWidthOffset + PicWidthInCtbsY) % PicWidthInCtbsY and ( inCtbAddrRowHeight − CtbAddrRowHeightOffset + PicHeightInCtbsY) % PicHeightInCtbsY, respectively, given the SPS of the input video stream.
    - Set the value of slice segment address equal to outCtbAddrColWidth + outCtbAddrRowHeight * PicWidthInCtbsY, given the replacement SPS of the output video stream.
- Reorder the VCL NAL units within each access unit for ascending values of slice_segment_address.
- For the first VCL NAL unit within each access unit, set the value of first_slice_segment_in_pic_flag equal to 1.

TABLE 3

- If each_tile_one_tile_set_flag equal to 0, for MCTSs whose mcts_id[ i ] equal to idx_of_mcts_in_set[ mctsEisIdTarget ][ mctsSetIdxTarget ][ 0 ], set colWidthOffsetInTiles and rowHeightOffsetInTiles equal to top_left_tile_index[ i ][ 0 ] % ( num tile_columns_minus1 + 1 ) and top_left_tile_index[ i ][ 0 ] / ( num_tile_columns_minus1 + 1 ), respectively.
- Else if each_tile_one_tile_set_flag equal to 1, set colWidthOffsetInTiles and rowHeightOffsetInTiles equal to idx_of_mcts_in_set[ mctsEisIdTarget ][ mctsSetIdxTarget ] [ 0 ] % ( num_tile_columns_minus1 + 1 ) and idx_of_mcts_in_set[ mctsEisIdTarget ] [ mctsSetIdxTarget ][ 0 ] / ( num_tile_columns_minus1 + 1 ), respectively.
- Calculate ctbAddrColWidthOffset and ctbAddrRowHeightOffset which are the sum of colWidth[ j ] for j ranges from 0 to colWidthOffsetInTiles and rowHeight[ j ] for j ranges from 0 to rowHeightOffsetInTiles, respectively, with the functions colWidth[ j ] and rowHeight[ j ] are evoked from defined in 6.5.1 given the SPS and PPS of the input video stream.L
- For each VCL NAL units in outBitstream, the following applies.
    -Set inCtbAddrColWidth and inCtbAddrRowHeight equal to slice_segment_address % PicWidthInCtbsY and slice_segment_address / PicWidthInCtbsY, respectively, given the SPS of the input video stream.
    -Set outCtbAddrColWidth and outCtbAddrRowHeight equal to ( inCtbAddrColWidth − ctbAddrColWidthOffset + PicWidthInCtbsY ) % PicWidthInCtbsY and (inCtbAddrRowHeight − ctbAddrRowHeightOffset + PicHeightInCtbsY ) % PicHeightInCtbsY, respectively, given the SPS of the input video stream.
    -Set the value of slice_segment_address equal to outCtbAddrColWidth + outCtbAddrRowHeight * PicWidthlnCtbsY, given the replacement SPS of the output video stream.
- Reorder the VCL NAL units within each access unit for ascending values of slice_segment_address.
- For the first VCL NAL unit within each access unit, set the value of first_slice_segment_in_pic_flag equal to 1.

Herein, as a value indicating an MCTS being delivered through an MCTS EIS SEI message, idx_of_mcts_in_set [mctsEisIdTarget][mctsSetIdxTarget][0] is a value being matched with an mcts_id of a temporal MCTS SEI message, and mctsEisIdTarget indicates an information set being a target (or goal) among information sets (VPS, SPS, PPS) being delivered by the MCTS EIS SEI message, and mctsSetIdxTarget indicates a specific MCTS set among sets of MCTSs being influenced by the same information set, and 0 indicates a foremost first MCTS within a specific MCTS set. Additionally, top_left_tile_index[i][0] indicates a foremost first top left tile index among the tiles configuring an $i^{th}$ MCTS, which is mcts_id[i]=idx_of_mcts_in_set[mctsEisId-Target][mctsSetIdxTarget][0], and num_tile_columns_minus1+1 indicates a number of tiles along a column direction in a decoded picture. And, in* indicates an input image (i.e., a related parameter on a 2D projected picture or a 2D packed picture including the entire image), and out* indicates a related parameter in an output image (i.e., a sub-picture including at least one MCTS in the input image). In the Table presented above, Section 6.5.1 may indicate a pre-defined standard, e.g., Section 6.5.1 of the HEVC standard document. For example, colWidth[j] indicates a width of a j-th tile column, and the width may be indicated based on units of CTBs. More specifically, the width may be indicated as a number of CTBs. Additionally, rowHeight[j] indicates a height of a j-th tile row, and the height may be indicated based on units of CTBs. More specifically, the height may be indicated as a number of CTBs.

More specifically, when extracting part of an image as an output picture (sub picture) through information of an MCTS extraction information set SEI message, a slice segment address according to Table 2 or Table 3 is reconfigured, and the method for reconfiguring an order of slices may be performed as described below.

1. Offsets (colWidthOffsetInTiles, rowHeightOffsetInTiles) along horizontal and vertical directions of an MCTS, which is to be positioned on a top left end of an output image, is obtained for an MCTS having an idx_of_mcts_in_set[mctsEisIdTarget][mctsSetIdxTarget][0].

1) In case an each_tile_one_tile_set_flag is equal to 0, for i, when mcts_id[i]=idx_of_mcts_in_set[mctsEisIdTarget][mctsSetIdxTarget][0], > colWidthOffsetInTiles=top_left_tile_index[$i$][0]%(num_tile_columns_minus1+1)
>
> rowHeightOffsetInTiles=top_left_tile_index[$i$][0]/(num_tile_columns_minus1+1)

2) In case an each_tile_one_tile_set_flag is equal to 1,

> colWidthOffsetInTiles=idx_of_mcts_in_set[mctsEisIdTarget][mctsSetIdxTarget][0]%(num_tile_columns_minus1+1)
>
> rowHeightOffsetInTiles=idx_of_mcts_in_set[mctsEisIdTarget][mctsSetIdxTarget][0]/(num_tile_columns_minus1+1)

Herein, as a value indicating an MCTS being delivered through an MCTS EIS SEI message, idx_of_mcts_in_set[mctsEisIdTarget][mctsSetIdxTarget][0] is a value being matched with an mcts_id of a temporal MCTS SEI message, and mctsEisIdTarget indicates an information set being a target among information sets (VPS, SPS, PPS) being delivered by the MCTS EIS SEI message, mctsSetIdxTarget indicates a specific MCTS set among sets of MCTSs being influenced by the same information set, and 0 indicates a foremost first MCTS within a specific MCTS set. This is the same as described above. Additionally, top_left_tile_index[i][0] indicates a foremost first top left tile index among the tiles configuring an $i^{th}$ MCTS, which is mcts_id[i]=idx_of_mcts_in_set[mctsEisIdTarget][mctsSetIdxTarget][0], and num_tile_columns_minus1+1 indicates a number of tiles along a column direction in a decoded picture. This is the same as described above.

2. colWidthOffsetInTiles, rowHeightOffsetInTiles, which is an offset of a tile unit for an input image, is transformed to ctbAddrColWidthOffset, ctbAddrRowHeightOffset of a CTB unit.

> ctbAddrColWidthOffset=colWidth[0]+colWidth[1]+ . . . +colWidth[colWidthOffsetInTiles]
>
> ctbAddrRowHeightOffset=rowHeight[0]+rowHeight[1]+ . . . +rowHeight[rowHeightOffsetInTiles]

For example, the colWidth[j] and the rowHeight[j] may be derived as shown below in Table 4 and Table 5, based on a uniform_spacing_flag indicating the presence or absence of uniform spacing.

TABLE 4

```
if( uniform_spacing_flag )
    for( j = 0; j <= num_tile_columns_minus1; j++ )
        colWidth[ j ] = (( j + 1 ) * PicWidthInCtbsY ) / ( num_tile_columns_minus1 + 1 ) −
            ( j * PicWidthInCtbsY ) / ( num_tile_columns_minus1 + 1 )
else {
    colWidth[ num_tile_columns_minus1 ] = PicWidthInCtbsY
    for( j = 0; j < num_tile_columns_minus1; j++ ) {
        colWidth[ j ] = column_width_minus1[ j ] + 1
        colWidth[ num_tile_columns_minus1 ] −= colWidth[ j ]
    }
}
```

TABLE 5

```
if( uniform_spacing_flag )
    for( j = 0; j <= num_tile_rows_minus1; j++ )
        rowHeight[ j ] = ((j + 1 ) * PicHeightInCtbsY ) / ( num_tile_rows_minus1 + 1 ) −
            ( j * PicHeightInCtbsY ) / ( num_tile_rows_minus1 + 1 )
else {
    rowHeight[ num_tile_rows_minus1 ] = PicHeightInCtbsY
    for( j = 0; j < num_tile_rows_minus1; j++ ){
        rowHeight[ j ] = row_height_minus1[ j ] + 1
        rowHeight[ num_tile_rows_minus1 ] −= rowHeight[ j ]
    }
}
```

3. A slice segment address value is transformed to a value that is appropriate for an output image for a slice being included in a VCL NAL unit. (Herein, however, only an NAL unit corresponding to the MCTS being included in the output image exists in the outBitstream.)

1) A position (inCtbAddrColWidth, inCtbAddrRowHeight) of a first CBT within a slice in the current VCL NAL unit is obtained in CTB units within the input image by using a PPS of an input image (entire image). At this point, PicWidthInCtbsY indicates a length along a horizontal direction for a Y channel (i.e., luma element) of the input image in CTB units.

inCtbAddrColWidth=slice_segment_address%PicWidthInCtbsY inCtbAddrRowHeight=slice_segment_address/PicWidthInCtbsY 2) A position (outCtbAddrColWidth, outCtbAddrRowHeight) of a first CBT, when repositioning is performed as much as (ctbAddrColWidthOffset, ctbAddrRowHeightOffset) for the corresponding slice, is obtained in CTB units within the input image. At this point, PicHeightInCtbsY indicates a length along a vertical direction for a Y channel of the input image in CTB units.

outCtbAddrColWidth=(inCtbAddrColWidth−ctbAddrColWidthOffset+PicWidthInCtbsY)%PicWidthInCtbsY outCtbAddrRowHeight=(inCtbAddrRowHeight−ctbAddrRowHeightOffset+PicHeightInCtbsY)%PicHeightInCtbsY 3) A slice segment address in an output image is obtained as described below. At this point, PicWidthInCtbsY indicates a length along a horizontal direction for a Y channel of the input image in CTB units.

slice_segment_address=outCtbAddrColWidth+outCtbAddrRowHeight*PicWidthInCtbsY

4. VCL NAL units are rearranged according to an increasing order of the slice segment address.

5. A slice header within a first_slice_segment_in_pic_flag is changed to 1 for a first slice segment.

The above-described method may be performed by a transmitting device (or encoding device), or the above-described method may be performed by a receiving device (or decoding device) by transmitting the related information.

According to the above-described method, positions of the MCTSs may be rearranged based on an order of the MCTSs. And, accordingly, the receiving device may derive a new slice address. Thus, the receiving device may derive a sub-picture that is available for independent processing and may then perform decoding and rendering. For example, in case a bitstream for the entire image is inputted, among the entire image, only part (e.g., sub picture) of the image is included, and a bitstream available for decoding may be reconfigured, and the reconfigured bitstream may then be decoded and rendered. In this case, the process of decoding or extracting the bitstream including only part (e.g., sub picture) of the entire image may be referred to as trans coding.

Additionally, according to the present disclosure, offset information for the first MCTS of the sub-picture may be separately signaled, and the offset information may be used for extracting sub-picture related information in the receiving device as well as the transmitting device. The offset information may indicate a width and height in CTB units as in ctbAddrColWidthOffset and ctbAddrRowHeightOffset.

Figure 18:
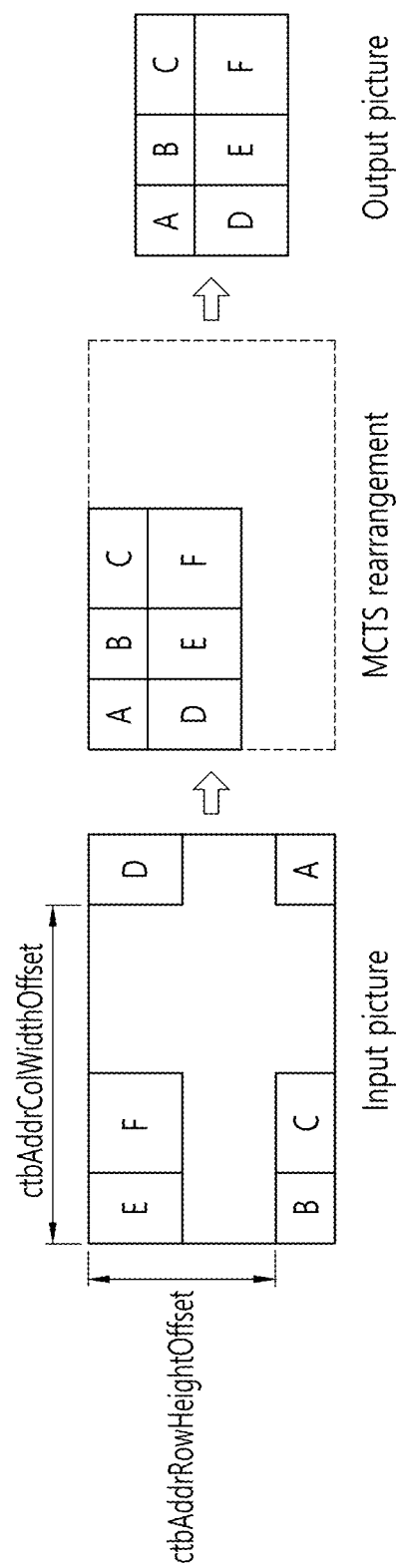
FIG. 18 and FIG. 19 show an exemplary process of extracting an output picture by rearranging MCTSs according to the present disclosure.
Figure 19:
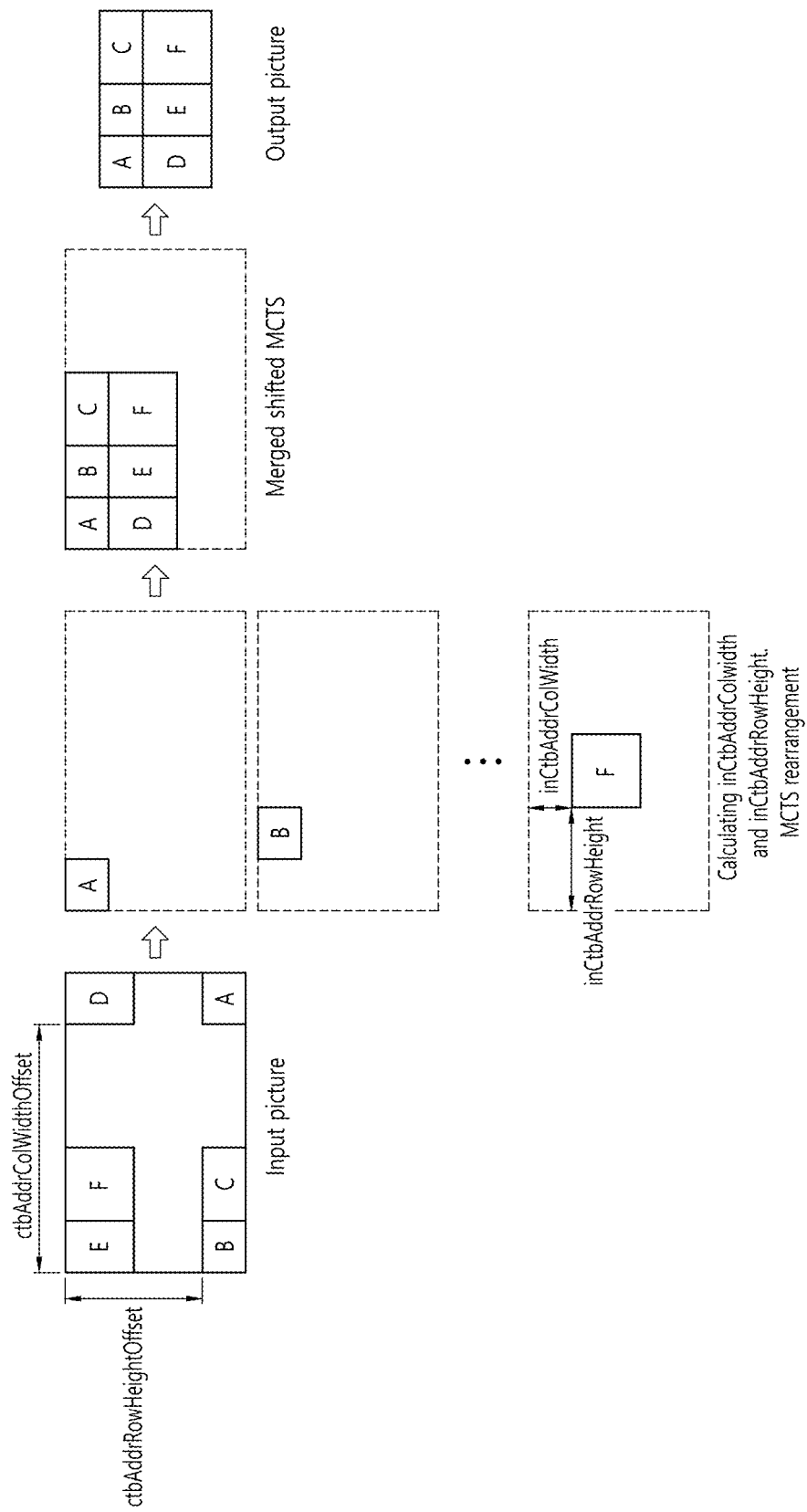

FIG. 18 and FIG. 19 show an exemplary process of extracting an output picture by rearranging MCTSs according to the present disclosure.

Referring to FIG. 18, MCTS E, F, D, B, C, A of a 2D input picture may configure one sub-picture by performing MCTS rearrangement. Although the MCTSs E and F, the MCTS D, the MCTSs B and C, and the MCTS A are spatially spaced apart on the input picture, in a 3D spherical surface, the MCTSs may each cover their neighboring areas. In case of rearranging the MCTSs, by performing rearrangement so that a point indicated by the offset information corresponds to a top left end point of the picture, the sub-picture may be derived from the output picture. Thereafter, the MCTSs may be rearranged in a raster scan order according to the indexing order. The slice segment address may be reconfigured based on such rearrangement, and the slice order may be reconfigured.

Referring to FIG. 19, offset information may further indicate position information of each MCTS. And, accordingly, each MCTS is rearranged on the input picture, and the sub-picture may be derived from the output picture by merging the rearranged MCTSs. In this case, the MCTSs may be numbered according to the raster scan order, and, based on such numbering, the slice segment address may be reconfigured and the order of the slices may be reconfigured.

The output picture (sub picture) may cover a subset of a spatial area of a 360-degree video content, and each output picture (sub picture) may be independently encoded so as to be outputted as a single-layer bitstream and independently decoded. Each output picture (sub picture) bitstream may be encapsulated within a file based on a separate track and may also be processed with streaming.

According to the present disclosure, in case an encoded bitstream exists based on a track that is configured based on an MCTS, only the NAL units configuring a subject sub-picture are extracted so as to configure a decodable bitstream. In this case, information for reconfiguring the above-described slice segment address and reconfiguring the order of the slices may be used in accordance with the present disclosure. For example, the related information may be used when part of the track is extracted in order to configure a sub-picture or a new bitstream while part or all of the image is in an encoded state.

Figure 20:
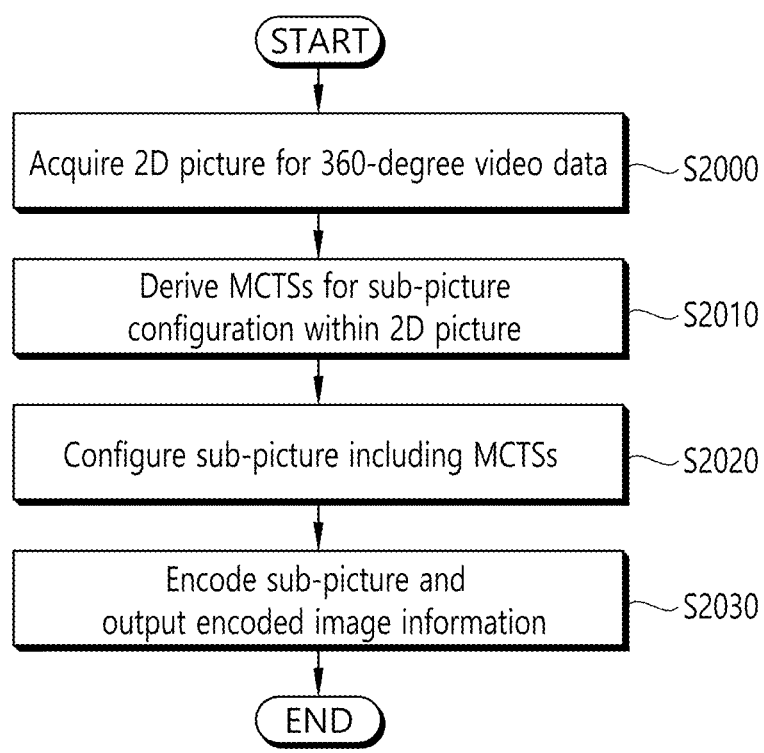
FIG. 20 shows a general diagram of an image encoding method according to the present disclosure.

FIG. 20 shows a general diagram of an image encoding method according to the present disclosure. The image encoding method may be performed by an encoding device (data encoder) or a 360-degree video transmitting device including the encoding device (data encoder).

The encoding device acquires a two-dimensional space (2D) picture for 360-degree video data (S2000). Herein, the 360-degree video includes a 360-degree image, and the 360-degree image may be an image taken by at least one 360-degree camera or may be an image generated or synthesized through an image processing device, such as a computer. Herein, the 2D picture may include the above-described original picture, a projected picture/packed picture, and a configured picture, and so on.

The encoding device derives MCTSs for a sub-picture configuration within the 2D picture (S2010). The sub-picture may include one or multiple MCTSs, and, among the MCTSs, part of the MCTSs may not be spatially adjacent on the 2D picture. Among the MCTSs, although part of the MCTSs may not be spatially adjacent on the 2D picture, the MCTSs may be spatially adjacent on a 3D space (spherical surface) that is to be presented or rendered. Herein, the MCTSs may be included in the above-described MCTS set.

The MCTS set may be indicated by an MCTS extraction information set Supplemental enhancement information (SEI) message.

The encoding device configures the sub-picture including the MCTSs based on the MCTSs (S2020). The MCTSs may be arranged by a raster scan order on the sub-picture. In this case, the encoding device may arrange the MCTSs based on the method disclosed in the above-described Table 2 or Table 3.

For example, the encoding device may derive a horizontal offset and a vertical offset in the 2D picture of a first MCTS, among the MCTSs. Herein, the first MCTS indicates an MCTS that is positioned on a top left end of the sub-picture in the sub-picture.

In this case, the horizontal offset and the vertical offset of the first MCTS being positioned on a top left end of the sub-picture may be derived based on the following equation.

$$colWidthOffsetInTiles=top\_left\_tile\_index[i][0]\%(num\_tile\_columns\_minus1+1)$$

$$rowHeightOffsetInTiles=top\_left\_tile\_index[i][0]/(num\_tile\_columns\_minus1+1)$$ [Equation 1]

Herein, colWidthOffsetInTiles indicates which tile column position the horizontal offset of the first MCTS corresponds to along a width direction in tile units, and rowHeightOffsetInTiles indicates which tile row position the vertical offset of the first MCTS corresponds to along a height direction in tile units, and top_left_tile_indx[i][0] indicates an index of a foremost first tile among the at least one tiles configuring the first MCTS, and num_tile_columns_minus1+1 indicates a number of tile rows within the 2D picture.

The encoding device may derive a horizontal offset in coding tree block (CTB) units based on the horizontal offset in tile units, and the encoding device may derive a vertical offset in CTB units based on the vertical offset in tile units.

A horizontal position and a vertical position in CTB units within the sub-picture for a specific MCTS, among the MCTSs may be derived based on the following equation.

$$outCtbAddrColWidth=(inCtbAddrColWidth-ctbAddrColWidthOffset+PicWidthInCtbsY)\%PicWidthInCtbsY$$

$$outCtbAddrRowHeight=(inCtbAddrRowHeight-ctbAddrRowHeightOffset+PicHeightInCtbsY)\%PicHeightInCtbsY$$ [Equation 2]

Herein, outCtBAddrColwidth may indicate a horizontal position in CTB units within the sub-picture for the specific MCTS, and outCtbAddrRowHeight may indicate a vertical position within the sub-picture for the specific MCTS, and inCtbAddrColwidth may indicate a horizontal position in CTB units within the 2D picture for the specific MCTS, and inCtbAddrRowHeight may indicate a vertical position in CTB units within the 2D picture for the specific MCTS, and ctbAddrColWidthOffset may indicate a horizontal offset in CTB units, and ctbAddrWowHeightOffset may indicate a vertical offset in CTB units, and PicWidthInCtbsY may indicate a width in CTB units for the entire picture including the sub-picture, and PicHeightInCtbsY may indicate a height in CTB units for the entire picture including the sub-picture.

A video coding layer (VCL) network abstract layer (NAL) unit for each of the MCTSs configuring the sub-picture may be configured, and the VCL NAL unit may include a slice, the slice may include a slice header, and the slice header may include slice segment address information. The slice segment address information may be derived based on the following equation.

$$slice\_segment\_address=outCtbAddrColWidth+outCtbAddrRowHeight*PicWidthInCtbsY$$ [Equation 3]

Herein, PicWidthInCtbsY, in this case, indicates a width of an image for an outBitstream. The MCTSs may be arranged according to a raster scan order based on a slice segment address value, which is derived by the slice segment address information. In this case, the MCTSs may be arranged according to an increasing order (or ascending order) of the related slice segment address values.

The encoding device encodes the sub-picture and outputs encoded image information (S2030). The image information includes MCTS index information for the MCTSs, and the MCTS index information may serially indicate the MCTSs on the sub-picture according to the raster scan order. The image information may include a video coding layer (VCL) network abstract layer (NAL) unit for each of the MCTSs. The image information may further include width information and height information of the sub-picture. In this case, the width information and the height information of the sub-picture may be included in a sequence parameter set (SPS) being included in the image information. The image information may include a horizontal offset in tile units and a vertical offset in tile units. Alternatively, the image information may include a horizontal offset in CTB units and a vertical offset in CTB units. The image information may include the MCTS extraction information set SEI message. The encoding device may independently encode the sub-picture and may output the encoded sub-picture in a bitstream format. The encoded image information may be processed with a predetermined number of processes and may then be transmitted to a decoding device via storage device, broadcast network, and/or broadband. For example, the 360-degree video transmitting device may encapsulate the encoded image information and/or metadata in a file format. In order to store or transmit the encoded image information and/or metadata, the 360-degree video transmitting device may encapsulate the encoded image information and/or metadata to a file format, such as ISOBMFF, CFF, and so on, or the 360-degree video transmitting device may process the encoded image information and/or metadata to other DASH segment formats, and so on. The 360-degree video transmitting device may include the metadata in the file format. The 360-degree video transmitting device may perform processes for transmission on the encapsulated file in accordance with the file format. The 360-degree video transmitting device may process a file according to a random transmission protocol. The processes for transmission may include processing for transport (or delivery) via broadcast network, or processing for transport (or delivery) via communication network, such as broadband, and so on. Additionally, the 360-degree video transmitting device may also perform processes for transmission on the metadata. The 360-degree video transmitting device may transmit the transmission-processed 360-degree video data and the metadata via broadcast network and/or broadband.

Figure 21:
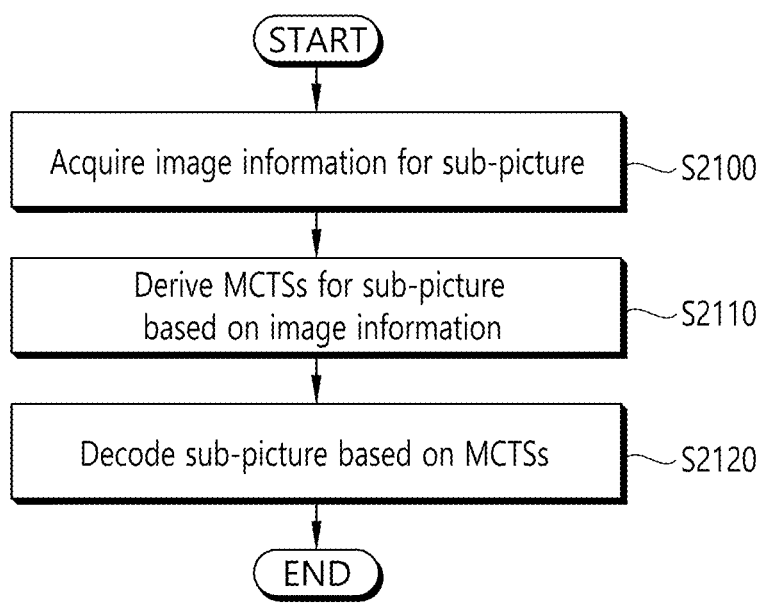
FIG. 21 shows a general diagram of an image decoding method according to the present disclosure.

FIG. 21 shows a general diagram of an image decoding method according to the present disclosure. The image decoding method may be performed by a decoding device (data decoder) or by a 360-degree video receiving device including the decoding device (data decoder).

Referring to FIG. 21, the decoding device acquires image information for a sub-picture (S2100). The decoding device may receive the image information, which is signaled through a broadcast network. Alternatively, the decoding device may receive the image information through a communication network, such as broadband, and so on, or a storage medium. Herein, the sub-picture may be positioned on a packed picture or a projected picture.

The decoding device derives MCTSs for the sub-picture based on the image information (S2110). The sub-picture may include one or multiple MCTSs, and, among the MCTSs, part of the MCTSs may not be spatially adjacent on the 2D picture. Among the MCTSs, although part of the MCTSs may not be spatially adjacent on the 2D picture, the MCTSs may be spatially adjacent on a 3D space (spherical surface) that is to be presented or rendered. Herein, the MCTSs may be included in the above-described MCTS set. The MCTS set may be indicated by an MCTS extraction information set Supplemental enhancement information (SEI) message.

The MCTSs may be arranged by a raster scan order on the sub-picture. In this case, the encoding device may arrange the MCTSs based on the method disclosed in the above-described Table 2 or Table 3.

For example, the decoding device may derive a horizontal offset and a vertical offset in the 2D picture of a first MCTS, among the MCTSs. Herein, the first MCTS indicates an MCTS that is positioned on a top left end of the sub-picture in the sub-picture.

In this case, the horizontal offset and the vertical offset of the first MCTS being positioned on a top left end of the sub-picture may be derived based on the above-described Equation 1, or the horizontal offset and the vertical offset may be signaled via the image information.

The decoding device may derive a horizontal offset in coding tree block (CTB) units based on the horizontal offset in tile units, and the decoding device may derive a vertical offset in CTB units based on the vertical offset in tile units.

A horizontal position and a vertical position in CTB units within the sub-picture for a specific MCTS, among the MCTSs may be derived based on the above-described Equation 2.

The image information may include a video coding layer (VCL) network abstract layer (NAL) unit for each of the MCTSs configuring the sub-picture, and the VCL NAL unit may include a slice, the slice may include a slice header, and the slice header may include slice segment address information. The slice segment address information may be derived based on the above-described Equation 3.

The MCTSs may be arranged according to a raster scan order based on a slice segment address value, which is derived by the slice segment address information. In this case, the MCTSs may be arranged according to an increasing order (or ascending order) of the related slice segment address values.

The image information may include MCTS index information for the MCTSs. In this case, the decoding device may arrange the MCTSs on the sub-picture according to the raster scan order based on the MCTS index information.

The image information may include width information and height information of the sub-picture. In this case, the width information and the height information of the sub-picture may be included in a sequence parameter set (SPS) being included in the image information.

The decoding device decodes the sub-picture based on the MCTSs (S2120). The decoding device may independently decode the sub-picture.

Thereafter, the 360-degree video receiving device may process the decoded sub-picture based on the metadata and may render the processed sub-picture to a 3D space.

The above-described steps may be omitted or replaced by other steps performing similar/identical operations according to examples.

The 360-degree video transmission device according to an example of the present embodiment may include the aforementioned data input unit, stitcher, signaling processor, projection processor, data encoder, transmission processor, and/or transmitter. Each internal component has been described above. The 360-degree video transmission device and the internal components thereof according to an example of the present embodiment can perform the above-described examples of the 360-degree video transmission method of the present embodiment.

The 360-degree video reception device according to an example of the present embodiment may include the aforementioned receiver, reception processor, data decoder, signaling parser, re-projection processor and/or renderer. Each internal component has been described above. The 360-degree video reception device and the internal components thereof according to an example of the present embodiment can perform the above-described examples of the 360-degree video reception method of the present embodiment.

The internal components of the aforementioned devices may be processors which perform consecutive processes stored in a memory or hardware components configured as hardware. The components may be located inside/outside the devices.

The above-described modules may be omitted or replaced by other modules performing similar/identical operations according to examples.

The aforementioned parts, modules or units may be processors or hardware parts which perform consecutive processes stored in a memory (or storage unit). Each step described in the above-described examples may be performed by a processor or a hardware part. Each module/block/unit described in the above-described examples can operate as a hardware/processor. Further, the methods proposed by the present disclosure can be executed as code. This code can be written on a storage medium readable by a processor and read by a processor provided by a device.

Although the methods are described as a series of steps or blocks based on flowcharts in the above-described examples, the present embodiment is not limited to the order of steps and certain steps may be performed in different order from the aforementioned one or performed simultaneously. Further, those skilled in the art can understand that steps in flowcharts are not exclusive and other steps may be included or one or more steps of a flowchart may be omitted without affecting the scope of the present embodiment.

When the examples of the present embodiment are implemented in software, the above-described method may be implemented by modules (processes, functions, and so on) that perform the functions described above. Such modules may be stored in a memory and executed by a processor. The memory may be internal or external to the processor, and the memory may be coupled to the processor using various well-known means. The processor may comprise an application-specific integrated circuit (ASIC), other chipsets, a logic circuit and/or a data processing device. The memory may include a read-only memory (ROM), a random access memory (RAM), a flash memory, a memory card, a storage medium, and/or other storage device.

What is claimed is:

1. A method for decoding video data performed by a decoding device, the method comprising:
    receiving a bitstream including a picture for video data and signaling information for the video data, the picture being divided into one or more slice segments;
    parsing the signaling information;
    decoding the picture based on Motion Constrained Tile Sets (MCTSs),
    the signaling information including:
        index information for representing a MCTS index of a MCTS, width information representing a width for decoding the picture and height information representing a height for decoding the picture, and slice segment address information for representing a slice segment address of a slice segment for the MCTSs, wherein the parsing comprises:

extracting the MCTSs from the signaling information, and reordering the extracted MCTSs by adjusting a value of the slice segment address information.

2. The method of claim 1, further comprising:

deriving a horizontal offset and a vertical offset in the picture of a first MCTS, among the MCTSs, based on the bitstream, wherein the MCTSs are arranged according to a raster scan order on a sub-picture, and wherein the first MCTS indicates an MCTS being positioned on a top left end of the sub-picture in the sub-picture.

3. The method of claim 2, wherein the horizontal offset and the vertical offset of the first MCTS being position on a top left end of the sub-picture is derived based on the following equation:

colWidthOffsetInTiles=top_left_tile_index[$i$][0]%
(num_tile_columns_minus1+1)

rowHeightOffsetInTiles=top_left_tile_index[$i$][0]/
(num_tile_columns_minus1+1), and wherein colWidthOffsetInTiles indicates which tile column position the horizontal offset of the first MCTS corresponds to along a width direction in tile units, rowHeightOffsetInTiles indicates which tile row position the vertical offset of the first MCTS corresponds to along a height direction in tile units, top_left_tile_indx[$i$][0] indicates an index of a foremost first tile among the at least one tiles configuring the first MCTS, and num_tile_columns_minus1+1 indicates a number of tile rows within the picture.

4. The method of claim 3, further comprising:

deriving a horizontal offset in coding tree block (CTB) units based on the horizontal offset in tile units; and deriving a vertical offset in CTB units based on the vertical offset in tile units, wherein a horizontal position and a vertical position in CTB units within the sub-picture for a specific MCTS, among the MCTSs, are derived based on the following equation:

outCtbAddrColWidth=(inCtbAddrColWidth−ctbAddrColWidthOffset+PicWidthInCtbsY)
%PicWidthInCtbsY outCtbAddrRowHeight=(inCtbAddrRowHeight−ctbAddrRowHeightOffset+PicHeightInCtbsY)
%PicHeightInCtbsY, and wherein outCtBAddrColwidth indicates a horizontal position in CTB units within the sub-picture for the specific MCTS, outCtbAddrRowHeight indicates a vertical position within the sub-picture for the specific MCTS, inCtbAddrColwidth indicates a horizontal position in CTB units within the picture for the specific MCTS, inCtbAddrRowHeight indicates a vertical position in CTB units within the picture for the specific MCTS, ctbAddrColWidthOffset indicates a horizontal offset in CTB units, ctbAddrWowHeightOffset indicates a vertical offset in CTB units, PicWidthInCtbsY indicates a width in CTB units for the sub-picture, and PicHeightInCtbsY indicates a height in CTB units for the sub-picture.

5. The method of claim 4, wherein the bitstream includes a video coding layer (VCL) network abstract layer (NAL) unit for each of the MCTSs configuring the sub-picture, wherein the VCL NAL unit includes a slice, the slice includes a slice header, and the slice header includes the slice segment address information, wherein the slice segment address information is derived based on the following equation:

slice_segment_address=outCtbAddrColWidth+
outCtbAddrRowHeight*PicWidthInCtbsY, and wherein the MCTSs are arranged according to an ascending order of related slice segment address values.

6. The method of claim 2, wherein the MCTSs are included in an MCTS set, and wherein the MCTSs are arranged on the sub-picture according to the raster scan order based on the index information.

7. The method of claim 2, wherein the bitstream includes width information and height information of the sub-picture, and wherein the width information and the height information of the sub-picture are included in a sequence parameter set (SPS) being included in the bitstream.

8. An apparatus for decoding video data, the apparatus comprising:

a receiver configured to receive a bitstream including a picture for video data and signaling information for the video data, the picture being divided into one or more slice segments;

a parser configured to parse the signaling information;

a decoder configured to decode the picture based on Motion Constrained Tile Sets (MCTSs), the signaling information including index information for representing a MCTS index of each MCTS of the MCTSs, the signaling information further including width information representing a width for decoding the picture and height information representing a height for decoding the picture, the signaling information further including slice segment address information for representing a slice segment address of a slice segment for the MCTSs, wherein the parser is configured to:

extract the MCTSs from the signaling information, and reorder the extracted MCTSs by adjusting a value of the slice segment address information.

* * * * *